(12) United States Patent
Lam

(10) Patent No.: US 12,448,695 B2
(45) Date of Patent: Oct. 21, 2025

(54) METHOD FOR RECOVERING METAL FROM WASTE PRINTED CIRCUIT BOARD AND A CELL THEREOF

(71) Applicant: City University of Hong Kong, Kowloon (HK)

(72) Inventor: Chun Ho Lam, Fo Tan (HK)

(73) Assignee: City University of Hong Kong, Kowloon (HK)

(*) Notice: Subject to any disclaimer, the term of this patent is extended or adjusted under 35 U.S.C. 154(b) by 554 days.

(21) Appl. No.: 17/847,301

(22) Filed: Jun. 23, 2022

(65) Prior Publication Data

US 2023/0416936 A1    Dec. 28, 2023

(51) Int. Cl.
| | |
|---|---|
| C25C 7/06 | (2006.01) |
| C22B 7/00 | (2006.01) |
| C25C 1/12 | (2006.01) |
| C25C 1/16 | (2006.01) |
| C25C 1/20 | (2006.01) |

(52) U.S. Cl.
CPC ............... C25C 7/06 (2013.01); C22B 7/006 (2013.01); C25C 1/12 (2013.01); C25C 1/16 (2013.01); C25C 1/20 (2013.01)

(58) Field of Classification Search
CPC ..................................... C25D 3/38; C25C 1/12
See application file for complete search history.

(56) References Cited

U.S. PATENT DOCUMENTS

| | | | | |
|---|---|---|---|---|
| 2,162,676 | A * | 6/1939 | Macallum | C07C 33/044 568/851 |
| 4,431,496 | A * | 2/1984 | Remick | C25C 1/16 205/602 |
| 5,750,018 | A * | 5/1998 | Brasch | C25D 3/38 205/297 |
| 6,086,733 | A * | 7/2000 | Carey | C25C 1/20 204/263 |
| 2006/0210823 | A1* | 9/2006 | Sano | C25D 1/04 205/291 |
| 2006/0226024 | A1* | 10/2006 | Sandoval | C25C 1/12 205/576 |
| 2010/0012502 | A1* | 1/2010 | Lapidus-Lavine | C25B 1/04 205/560 |

OTHER PUBLICATIONS

Costa et al., Electrochemical double layer at the interfaces of Hg/choline chloride based solvents, Electrochemica Acta, vol. 55, No. 28, Dec. 2010, pp. 8916-8920 (Year: 2010).*

(Continued)

*Primary Examiner* — Harry D Wilkins, III
(74) *Attorney, Agent, or Firm* — Renner, Kenner, Greive, Bobak, Taylor & Weber

(57) ABSTRACT

A metal recovery device for recovering metal in a waste printed circuit board by way of electrodeposition including: a cathode, an anode, and an electrolyte in electrical communication with the cathode and the anode, wherein the electrolyte includes a glycol-based compound and a metal chloride. A method of preparing an electrolyte for use in the same. A method of metal recovery for recovering metal from waste printed circuit board by making use the same.

23 Claims, 22 Drawing Sheets
(2 of 22 Drawing Sheet(s) Filed in Color)

(56) References Cited

OTHER PUBLICATIONS

Ghosh et al., Electrochemical copper deposition from an ethaline-CuCl2•2H2O DES, Surface and Coatings Technology, vol. 238, Jan. 2014, pp. 165-173 (Year: 2014).*

Kumar et al., Growth and characterization of copper, indium and copper-indium alloy films non-aqueous method of electrodeposition , Indian Journal of Pure & Applied Physics, vol. 46, Mar. 2008, pp. 198-203 (Year: 2008).*

Liu et al., A Green Slurry Electrolysis to Recover Valuable Metals from Waste Electrical and Electronic Equipment in Recyclable Ph-Neutral Ethylene Glycol, Preprint copy available online at https://papers.ssrn.com/sol3/papers.cfm?abstract_id=3999038, first available Feb. 2022, accessed on Aug. 25, 2025 (Year: 2022).*

Friedrich et al., Reticulated vitreous carbon as an electrode material, Journal of Electroanalytical Chemistry, vol. 561, Jan. 2004, pp. 203-217 (Year: 2004).*

Al-Saady, F.A.A., Abbar, A.H., 2021. Simultaneous removal of cadmium and copper from a binary solution by cathodic deposition using a spiral-wound woven wire meshes packed bed rotating cylinder electrode. J. Electrochem. Sci. Technol. 12, 58-66.

Anggara, S., Bevan, F., Harris, R.C., Hartley, J.M., Frisch, G., Jenkin, G.R., Abbott, A.P., 2019. Direct extraction of copper from copper sulfide minerals using deep eutectic solvents. Green. Chem. 21, 6502-6512.

Awasthi, A.K., Zeng, X., Li, J., 2016. Environmental pollution of electronic waste recycling in India: a critical review. Environ. Pollut. 211, 259-270.

C.P. Bald'e, V. Forti, V. Gray, R. Kuehr, P. Stegmann, 2017. The global e-waste monitor 2017: Quantities, flows and resources, The International Telecommunication Union.

Barcena, H.S., 2016. Toxic to the heart: target organ toxicity and NMR spectroscopy of NSAIDs. In: Green Chemistry Experiments in Undergraduate Laboratories. American Chemical Society, pp. 149-163.

A. Beals, V. Rangarajan, S.K. Rao, P.D. O'Rourke, MIT Green Computing, in, Massachusetts Institute of Technology, 2001, pp. An Examination of the Environmental Effects of Computers at MIT.

Carroll, K.J., Reveles, J.U., Shultz, M.D., Khanna, S.N., Carpenter, E.E., 2011. Preparation of elemental Cu and Ni nanoparticles by the polyol method: an experimental and theoretical approach. J. Phys. Chem. C 115, 2656-2664.

Cucchiella, F., D'Adamo, I., Lenny Koh, S.C., Rosa, P., 2015. Recycling of WEEEs: an economic assessment of present and future e-waste streams. Renew. Sustain. Energy Rev. 51, 263-272.

Cui, J., Forssberg, E., 2003. Mechanical recycling of waste electric and electronic equipment: a review. J. Hazard. Mater. 99, 243-263.

De Vreese, P., Brooks, N.R., Van Hecke, K., Van Meervelt, L., Matthijs, E., Binnemans, K., Van Deun, R., 2012. Speciation of Copper(II) complexes in an ionic liquid based on choline chloride and in choline chloride/water mixtures. Inorg. Chem. 51, 4972-4981.

Delfini, M., Ferrini, M., Manni, A., Massacci, P., Piga, L., Scoppettuolo, A., 2011. Optimization of precious metal recovery from waste electrical and electronic equipment boards. J. Environ. Prot. 2, 675-682.

Feng, Z.V., Li, X., Gewirth, A.A., 2003. Inhibition due to the interaction of polyethylene glycol, chloride, and copper in plating baths: a surface-enhanced raman study. J. Phys. Chem. B 107, 9415-9423.

Fogarasi, S., Imre-Lucaci, F., Imre-Lucaci, A., Ilea, P., 2014. Copper recovery and gold enrichment from waste printed circuit boards by mediated electrochemical oxidation. J. Hazard Mater. 273, 215-221.

Freer, R., Curzons, A., 2002. The pros and cons of using ionic liquids in the pharmaceutical industry. In: Rogers, R.D., Seddon, K.R., Volkov, S. (Eds.), Green Industrial Applications of Ionic Liquids. Springer, Netherlands, Dordrecht, pp. 129-136.

Friedrich, J., Ponce-de-Leo'n, C., Reade, G., Walsh, F., 2004. Reticulated vitreous carbon as an electrode material. J. Electroanal. Chem. 561, 203-217.

Fujimori, T., Itai, T., Goto, A., Asante, K.A., Otsuka, M., Takahashi, S., Tanabe, S., 2016. Interplay of metals and promine with dioxin-related compounds concentrated in e-waste open burning soil from Agbogbloshie in Accra, Ghana. Environ. Pollut. 209, 155-163.

Gangwar, C., Choudhari, R., Chauhan, A., Kumar, A., Singh, A., Tripathi, A., 2019. Assessment of air pollution caused by illegal e-waste burning to evaluate the human health risk. Environ. Int. 125, 191-199.

Jin, Q., Tao, D., Lu, Y., Sun, J., Lam, C.H., Su, G., He, Y., 2021. New insight on occurrence of liquid crystal monomers: a class of emerging e-waste pollutants in municipal landfill leachate. J. Hazard Mater. 423, 127146.

Kumar, A., Holuszko, M., Espinosa, D.C.R., 2017. E-waste: an overview on generation, collection, legislation and recycling practices. Resour. Conserv. Recycl. 122, 32-42.

Lam, Chun Ho, Jackson, James E., 2019. Teaching Electrochemistry with Common Objects: Electrocatalytic Hydrogenation of Acetol with US Coins. Journal of Chemical Education 97 (1), 172-177.

Li, F., Chen, M., Shu, J., Shirvani, M., Li, Y., Sun, Z., Sun, S., Xu, Z., Fu, K., Chen, S., 2019. Copper and gold recovery from CPU sockets by one-step slurry electrolysis. J. Clean. Prod. 213, 673-679.

Li, Y., Richardson, J.B., Mark Bricka, R., Niu, X., Yang, H., Li, L., Jimenez, A., 2009. Leaching of heavy metals from E-waste in simulated landfill columns. Waste Manag. 29, 2147-2150.

Love, C.P., Torardi, C.C., Page, C.J., 1992. Two new barium-copper-ethylene glycol complexes: synthesis and structure of BaCu(C2H6O2)n(C2H4O2)2 (n 3, 6). Inorg. Chem. 31, 1784-1788.

Wang, C.-y.; Qiu, D.-f.; Yin, F.; Wang, H.-y.; Chen, Y.-q., Slurry electrolysis of ocean polymetallic nodule. Transactions of Nonferrous Metals Society of China 2010, 20, s60-s64.

Wang, M.-y.; Wang, Z.; Guo, Z.-c., Preparation of electrolytic copper powders with high current efficiency enhanced by super gravity field and its mechanism. Transactions of Nonferrous Metals Society of China 2010, 20 (6), 1154-1160.

Wang, J.; Huang, Z.; Yang, D.; Zeng, X.; Chen, M.; Shu, J.; Sun, Z.; Sun, S.; Xiao, Z., A semi-scaled experiment for metals separating and recovering from waste printed circuit boards by slurry electrolysis. Process Safety and Environmental Protection 2021, 147, 37-44.

Yang, D.; Chu, Y.; Wang, J.; Chen, M.; Shu, J.; Xiu, F.; Xu, Z.; Sun, S.; Chen, S., Completely separating metals and nonmetals from waste printed circuit boards by slurry electrolysis. Separation and Purification Technology 2018, 205, 302-307.

Zhang, S.; Li, Y.; Wang, R.; Xu, Z.; Wang, B.; Chen, S.; Chen, M., Superfine copper powders recycled from concentrated metal scraps of waste printed circuit boards by slurry electrolysis. Journal of Cleaner Production 2017, 152, 1-6.

Qi, Y.; Yi, X.; Zhang, Y.; Meng, F.; Shu, J.; Xiu, F.; Sun, Z.; Sun, S.; Chen, M., Effect of ionic liquid [Mlm]HSO4 on WPCB metal-enriched scraps refined by slurry electrolysis. Environ Sci Pollut Res Int 2019, 26 (32), 33260-33268.

Liu, K.; Huang, S.; Jin, Y.; Ma, L.; Wang, W.-X.; Lam, J. C.-H., A green slurry electrolysis to recover valuable metals from waste printed circuit board (WPCB) in recyclable pH-neutral ethylene glycol. Journal of Hazardous Materials, 2022, 433, 128702.

\* cited by examiner

| Metallic Content (wt%) | | | | | | | | | | | | | | |
|---|---|---|---|---|---|---|---|---|---|---|---|---|---|---|
| Cu | Fe | Al | Zn | Sn | Mg | Ba | Cr | Ti | Ag | Mn | Mo | Pb | Ni | Sum |
| 13.20 ± 1.04 | 7.62 ± 1.33 | 1.75 ± 0.66 | 2.40 ± 0.22 | 3.14 ± 0.21 | 0.95 ± 0.05 | 1.01 ± 0.10 | 0.51 ± 0.03 | 0.34 ± 0.03 | 0.12 ± 0.02 | 0.05 ± 0.01 | 0.01 ± 0.01 | 0.09 ± 0.02 | 1.29 ± 0.25 | 32.56 ± 3.86 |

Fig. 3

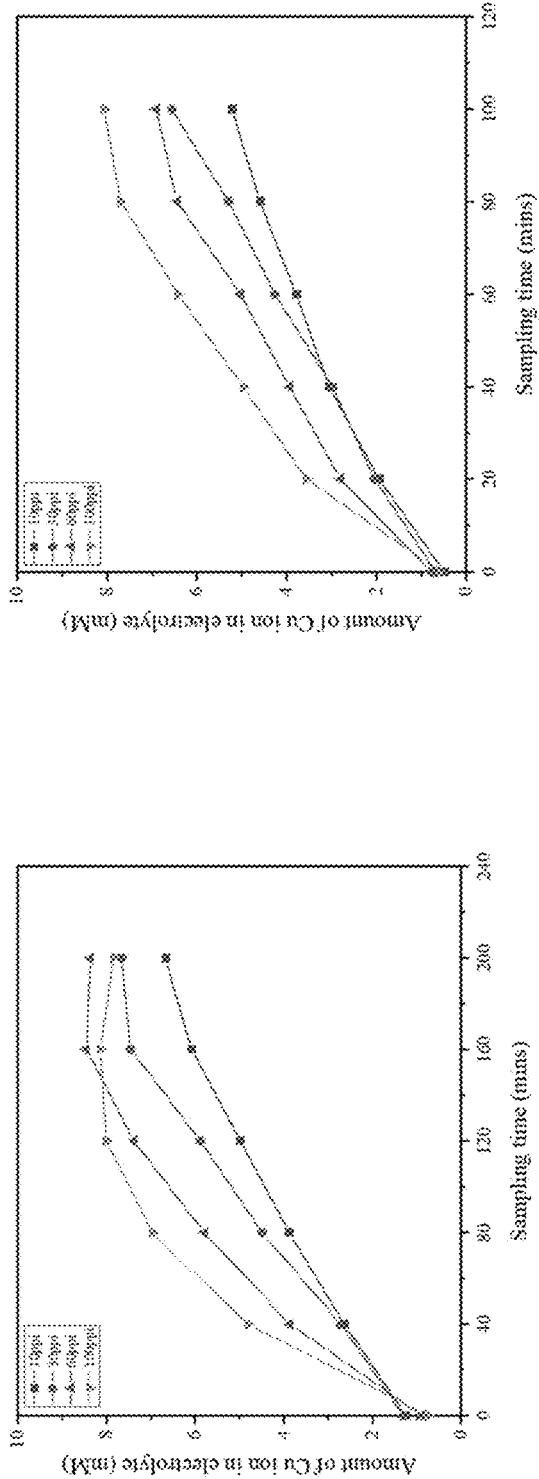
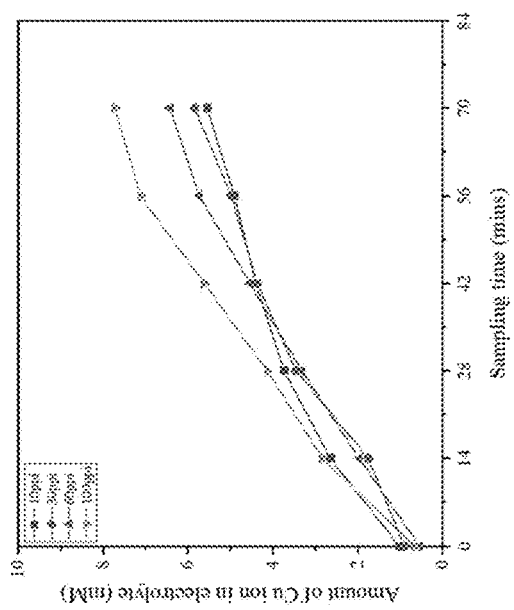
Fig. 5A
Fig. 5B
Fig. 5C

| Current & RVC (ppi) | Cu Deposit on Cathode (μmol) | [Cu²⁺] in electrolyte (mM) | FE$_A$% | Cu$_R$ (%) |
|---|---|---|---|---|
| 10mA, 10ppi | 66.09 ± 7.7 | 3.34 ± 0.25 | 64.63 ± 0.74 | 21.15 ± 2.46 |
| 10mA, 30ppi | 58.85 ± 3.97 | 3.84 ± 0.45 | 68.78 ± 0.45 | 18.85 ± 1.27 |
| 10mA, 60ppi | 76.82 ± 14.22 | 4.18 ± 0.62 | 79.09 ± 1.26 | 24.58 ± 3.91 |
| 10mA, 100ppi | 64.64 ± 14.39 | 3.93 ± 0.23 | 71.80 ± 0.84 | 20.69 ± 4.61 |
| 20mA, 10ppi | 23.18 ± 3.76 | 2.61 ± 0.48 | 20.64 ± 0.25 | 7.43 ± 1.21 |
| 20mA, 30ppi | 35.94 ± 6.6 | 3.28 ± 0.35 | 27.05 ± 5.25 | 11.50 ± 2.11 |
| 20mA, 60ppi | 42.45 ± 14.33 | 3.46 ± 0.15 | 29.30 ± 0.91 | 13.60 ± 4.59 |
| 20mA, 100ppi | 41.35 ± 5.46 | 4.04 ± 0.45 | 32.86 ± 0.81 | 13.23 ± 1.75 |
| 30mA, 10ppi | 33.02 ± 3.36 | 2.78 ± 0.21 | 15.56 ± 0.50 | 10.57 ± 1.08 |
| 30mA, 30ppi | 37.45 ± 13.37 | 2.92 ± 0.16 | 16.66 ± 0.39 | 11.99 ± 4.28 |
| 30mA, 60ppi | 40.83 ± 8.08 | 3.21 ± 0.35 | 18.25 ± 0.30 | 13.05 ± 2.58 |
| 30mA, 100ppi | 42.19 ± 15.27 | 3.87 ± 0.52 | 21.26 ± 0.39 | 13.50 ± 4.89 |

Fig. 6

| Electrolyte | Supporting Electrolyte | Conductivity (mS cm⁻¹) | Electrolyte Observation | Cu²⁺ ions in Electrolyte (mM) | Cu Deposition on Cathode (μmol) |
|---|---|---|---|---|---|
| Water | 100 mM NaCl | 81.7 | copper (hydro)oxide formed on the RVC anode | 1.3 | N.D. |
| Methanol | 20 mM NH₄Cl 2.2 mM KCl | 20.0 | copper methoxide formed on the RVC anode | 1.3 | N.D. |
| Water (pH 1 H₂SO₄) | — | 75.8 | turned transparent blue | 1.6 | N.D. |
| 0.1 M Choline Chloride in EG | — | 9.0 | turned transparent green | 3.8 | 25.4 |
| Propylene Glycol | 4.0 mM NH₄Cl 1.0 mM KCl | 2.6 | turned transparent green and blue | 6.1 | 61.0 |
| Ethylene Glycol | 2.2 mM NH₄Cl 1.4 mM NaCl | 1.5 | turned transparent blue | 1.4 | N.D. |
| Ethylene Glycol | 2.2 mM NH₄Cl 1.4 mM KCl | 1.2 | turned transparent green and blue | 9.5 | 156.2 |

Fig. 9

| Electrolyte | Conductivity (mS cm$^{-1}$) | Potential Difference(V) |
|---|---|---|
| Water | 81.7 | 1.91 ± 0.01 |
| Methanol | 20.0 | 3.21 ± 0.68 |
| Water (pH 1 H$_2$SO$_4$) | 75.8 | 2.12 ± 0.02 |
| 0.1M Choline Chloride in EG | 9.0 | 4.56 ± 0.16 |
| Propylene Glycol | 2.6 | 7.75 ± 0.08 |
| Ethylene Glycol | 1.2 | 9.02 ± 0.12 |

Fig. 10

| Dopants | $Cu^{2+}$ | | $Sn^{2+}$ | | $Cr^{3+}$ | |
| --- | --- | --- | --- | --- | --- | --- |
| | Cu | Cd | Cu | Sn | Cu | Cr |
| Metal Deposition (μmol) | 103.4 | 85.4 | 87.8 | 4.6 | 39.2 | N.D. |
| Metal Recovery (%) | 69 | 57 | 59 | 3 | 26 | N.D. |
| Cu Selectivity (%) | 55 | -- | 95 | -- | >99 | -- |

Fig. 12

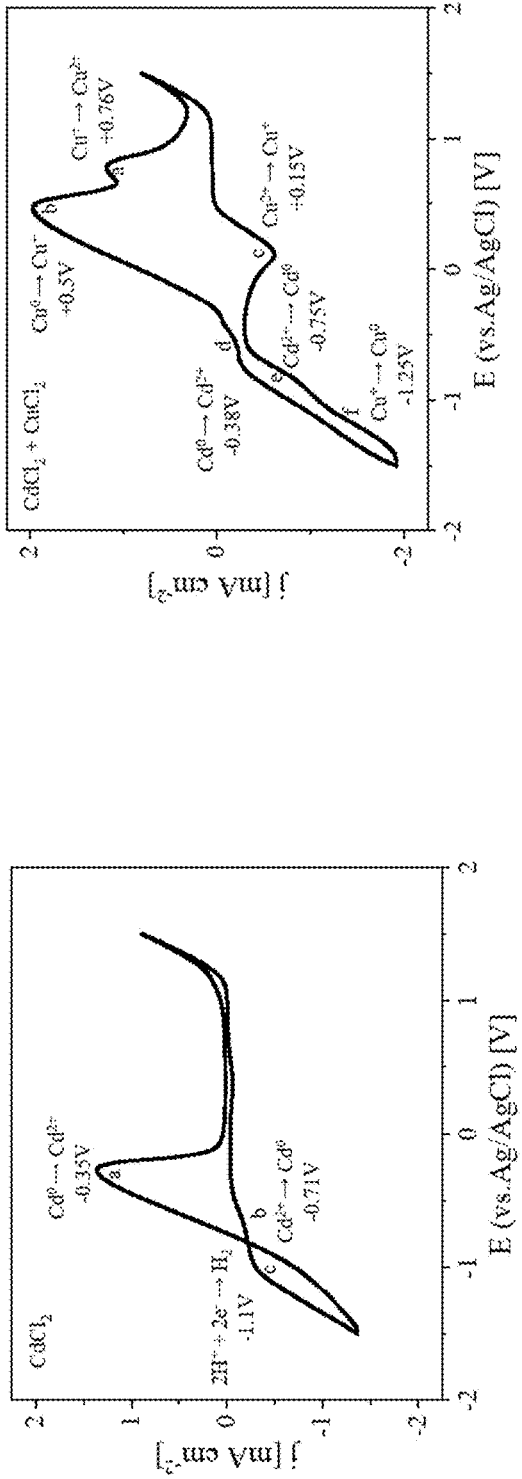
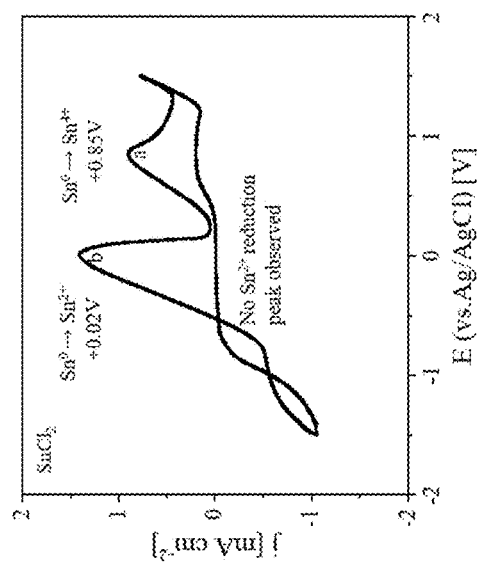
Fig. 13A
Fig. 13B
Fig. 13C

| Sampling Time(mins) | Voltage(V) | Electricity(kW.hr) *$10^{-3}$ |
|---|---|---|
| 0 | 2.55 | - |
| 10 | 2.54 | 1.15 |
| 20 | 2.54 | 1.15 |
| 30 | 2.52 | 1.15 |
| 40 | 2.53 | 1.14 |
| 50 | 2.53 | 1.15 |
| 60 | 2.51 | 1.14 |
| 70 | 2.45 | 1.12 |
| 80 | 2.41 | 1.10 |
| 90 | 2.40 | 1.09 |
| 100 | 2.37 | 1.08 |
| 110 | 2.36 | 1.07 |
| 120 | 2.33 | 1.06 |
| 130 | 2.31 | 1.05 |
| 140 | 2.29 | 1.04 |
| 150 | 2.78 | 1.15 |
| 160 | 2.71 | 1.24 |
| 170 | 2.66 | 1.22 |
| 180 | 2.66 | 1.21 |
| 190 | 2.45 | 1.16 |
| 200 | 2.52 | 1.13 |
| 210 | 2.48 | 1.13 |
| 220 | 2.59 | 1.15 |
| 230 | 2.65 | 1.19 |
| 240 | 2.54 | 1.18 |
| 250 | 2.48 | 1.14 |
| 260 | 2.49 | 1.13 |
| 270 | 2.41 | 1.11 |
| 280 | 2.40 | 1.09 |
| 290 | 2.39 | 1.09 |
| 300 | 2.36 | 1.08 |
| 310 | 2.37 | 1.07 |
| 320 | 2.37 | 1.07 |
| 330 | 2.36 | 1.07 |
| 340 | 2.35 | 1.07 |
| 350 | 2.34 | 1.06 |
| 360 | 2.45 | 1.09 |
| 370 | 2.39 | 1.10 |
| 380 | 2.34 | 1.07 |
| 390 | 2.37 | 1.07 |
| 400 | 2.22 | 1.04 |
| 410 | 2.28 | 1.02 |
| 420 | 2.18 | 1.01 |
| 430 | 2.16 | 0.98 |
| 440 | 2.16 | 0.98 |
| 450 | 2.11 | 0.97 |
| 460 | 2.10 | 0.95 |
| 470 | 2.17 | 0.97 |
| 480 | 2.18 | 0.99 |
| 490 | 2.15 | 0.98 |
| 500 | 2.16 | 0.98 |
| Total | - | 54.43 |

Fig. 16

| Metal Components | FE$_C$ % | | | | | | Selectivity (%) | | | | | |
| --- | --- | --- | --- | --- | --- | --- | --- | --- | --- | --- | --- | --- |
| | 1st use | 2nd use | 3rd use | 4th use | 5th use | 6th use | 1st use | 2nd use | 3rd use | 4th use | 5th use | 6th use |
| Cu | 33.89 ± 2.56 | 33.80 ± 3.68 | 50.02 ± 1.84 | 56.02 ± 0.19 | 56.44 ± 0.99 | 57.58 ± 0.96 | 47.82 ± 5.87 | 48.71 ± 1.43 | 56.62 ± 3.71 | 52.53 ± 2.17 | 51.71 ± 2.31 | 52.86 ± 2.51 |
| Fe | 15.57 ± 1.02 | 16.25 ± 1.22 | 16.52 ± 1.05 | 11.08 ± 1.64 | 11.68 ± 1.38 | 10.18 ± 0.91 | 19.27 ± 0.89 | 20.62 ± 1.22 | 16.77 ± 0.65 | 9.18 ± 1.70 | 9.43 ± 1.37 | 7.59 ± 0.11 |
| Al | 22.49 ± 1.68 | 22.71 ± 0.55 | 23.57 ± 0.51 | 4.53 ± 0.14 | 3.52 ± 0.99 | 3.08 ± 0.72 | 16.02 ± 2.86 | 14.31 ± 2.71 | 12.82 ± 4.14 | 1.20 ± 0.01 | 0.92 ± 0.28 | 0.91 ± 0.28 |
| Zn | 4.86 ± 0.36 | 5.40 ± 0.54 | 5.61 ± 0.13 | 7.60 ± 1.99 | 7.09 ± 0.54 | 7.66 ± 0.33 | 7.09 ± 0.49 | 8.02 ± 0.59 | 6.45 ± 0.36 | 7.26 ± 1.64 | 6.67 ± 0.33 | 8.02 ± 0.88 |
| Sn | 1.41 ± 0.02 | 1.28 ± 0.03 | 1.30 ± 0.08 | 10.16 ± 0.96 | 10.89 ± 1.47 | 8.80 ± 0.82 | 3.73 ± 0.26 | 3.45 ± 0.69 | 3.25 ± 0.55 | 17.74 ± 1.01 | 18.57 ± 2 | 17.87 ± 0.88 |
| Mg | 2.20 ± 0.21 | 1.23 ± 0.15 | 1.03 ± 0.25 | 0.56 ± 0.36 | 0.80 ± 0.4 | 0.69 ± 0.24 | 2.70 ± 0.21 | 1.47 ± 1.08 | 1.20 ± 0.40 | 0.46 ± 0.31 | 0.64 ± 0.33 | 0.46 ± 0.30 |
| Ba | 0.51 ± 0.15 | 0.58 ± 0.08 | 0.61 ± 0.19 | 3.43 ± 0.99 | 3.79 ± 1.09 | 4.29 ± 1.06 | 1.54 ± 0.08 | 1.80 ± 0.2 | 1.46 ± 0.43 | 6.89 ± 1.33 | 7.44 ± 1.95 | 7.41 ± 0.81 |
| Cr | 0.33 ± 0.03 | 0.20 ± 0.01 | 0.28 ± 0.12 | 0.76 ± 0.01 | 1.12 ± 0.35 | 1.05 ± 0.25 | 0.25 ± 0.16 | 0.16 ± 0.09 | 0.17 ± 0.07 | 0.39 ± 0.02 | 0.56 ± 0.16 | 0.52 ± 0.15 |
| Ti | 0.62 ± 0.12 | 0.59 ± 0.09 | 0.69 ± 0.15 | 2.68 ± 0.50 | 2.61 ± 0.28 | 3.69 ± 0.47 | 0.66 ± 0.04 | 0.65 ± 0.12 | 0.58 ± 0.11 | 1.88 ± 0.28 | 1.80 ± 0.14 | 2.23 ± 0.07 |
| Ag | 0.06 ± 0.13 | 0.04 ± 0 | 0.05 ± 0.02 | 0.39 ± 0.03 | 0.42 ± 0.01 | 0.38 ± 0.08 | 0.30 ± 0.02 | 0.20 ± 0.09 | 0.20 ± 0.07 | 1.23 ± 0.13 | 1.30 ± 1.07 | 1.03 ± 0.07 |
| Mn | 0.18 ± 0.02 | 0.17 ± 0.01 | 0.17 ± 0.01 | 0.07 ± 0 | 0.07 ± 0 | 0.06 ± 0 | 0.22 ± 0.01 | 0.21 ± 0.01 | 0.16 ± 0.01 | 0.06 ± 0 | 0.05 ± 0.16 | 0.05 ± 0 |
| Mo | 0.07 ± 0.01 | 0.07 ± 0.02 | 0.05 ± 0.03 | 0.02 ± 0.02 | 0.00 ± 0 | 0.02 ± 0.02 | 0.14 ± 0.01 | 0.15 ± 0.01 | 0.11 ± 0.01 | 0.03 ± 0.04 | 0.00 ± 0.14 | 0.05 ± 0 |
| Pb | 0.06 ± 0.03 | 0.05 ± 0 | 0.06 ± 0.01 | 0.06 ± 0.03 | 0.05 ± 0.06 | 0.05 ± 0.04 | 0.26 ± 0.16 | 0.25 ± 0.08 | 0.20 ± 0.07 | 1.17 ± 0 | 0.93 ± 0.21 | 0.99 ± 0.22 |

Fig. 17

| Sampling Time(mins) | Voltage(V) | Electricity(kW.hr) *10$^{-2}$ |
|---|---|---|
| 0 | 7.26 | - |
| 10 | 7.25 | 8.22 |
| 20 | 7.05 | 8.10 |
| 30 | 6.41 | 7.63 |
| 40 | 6.4 | 7.26 |
| 50 | 6.39 | 7.25 |
| 60 | 6.36 | 7.23 |
| 70 | 6.37 | 7.21 |
| 80 | 6.31 | 7.19 |
| 90 | 6.26 | 7.12 |
| 100 | 6.25 | 7.09 |
| 110 | 6.33 | 7.13 |
| 120 | 6.36 | 7.19 |
| 130 | 6.13 | 7.08 |
| 140 | 6.15 | 6.96 |
| 150 | 5.98 | 6.87 |
| 160 | 5.71 | 6.62 |
| 170 | 5.86 | 6.56 |
| 180 | 5.79 | 6.60 |
| 190 | 5.81 | 6.57 |
| 200 | 5.82 | 6.59 |
| 210 | 5.85 | 6.61 |
| 220 | 5.86 | 6.64 |
| 230 | 5.86 | 6.64 |
| 240 | 5.82 | 6.62 |
| 250 | 5.77 | 6.57 |
| 260 | 5.74 | 6.52 |
| 270 | 5.67 | 6.47 |
| 280 | 5.77 | 6.48 |
| 290 | 5.85 | 6.58 |
| 300 | 5.68 | 6.53 |
| Total | - | 208.14 |

Fig. 21

METHOD FOR RECOVERING METAL FROM WASTE PRINTED CIRCUIT BOARD AND A CELL THEREOF

TECHNICAL FIELD

The present invention relates to a method for recovering metal from waste printed circuit board for example particularly, but not exclusively, a method for recovering copper from waste printed circuit board. The present invention also relates to a metal recovery device thereof.

BACKGROUND OF THE INVENTION

Mobile device such as a mobile phone, tablet, e-reader, laptop and the like has become a necessity in $21^{st}$ century. Along with the rapid development and widespread of the mobile technology, it is not surprising that a substantial amount of electronic waste would be generated worldwide. It has been reported that the growth of Waste Electrical and Electronic Equipment (WEEE) is expected to increase by 1.48 million tons per year under the current projected growth rate, and the global e-waste generation is anticipated to reach 74.7 million tons by 2030. Although there is a steady growth of e-waste recycling at around 20%, it is far lacking behind the amount of e-waste generated as well as those disposed in local landfills.

It is appreciated that disposal of WEEE in landfills can promote the release of metals or persistent organic pollutants into the environment through leachate discharge. For example, simulated landfill studies showed a high level of metals in the solid waste samples surrounding the e-waste, suggesting that metals from e-waste could leak into the environment over a long period of time. Considering many developing nations rely heavily on agriculture production to sustain their local economy, the contamination of agricultural platform and water source could pose a longstanding threat to their economy and agricultural supply chain.

In contrast, recycling the metallic content from WEEE offers great environmental, economic, and health protection benefits. For example, economic analysis showed that the potential value of WPCBs was approximately USD $21,200 per ton for their metallic contents, and it is estimated that recycling WEEE (such as Cu and Al therein) can save 85% and 95% of the energy, respectively.

Slurry electrolysis (SE) is gaining increasing attention amongst the WEEE recycling community. Unlike other common metallurgical leaching methods, such as pyrometallurgy and hydrometallurgy, SE combines the leaching and electrodeposition steps into a single stage and the reaction can occur at room temperature and atmospheric pressure. The electrochemical aspect of SE can enable a direct connection between renewable electrical energy and chemical redox, which will improve the carbon footprint of the waste recycling processes.

Typically, SE setup requires a highly acidic aqueous environment, such as 0.3 M HCl and 150 g L$^{-1}$ H$_2$SO$_4$ and the like, to facilitate the leaching of metals from the WPCB composite and prevent the metal ions from precipitating as electrochemically inert metal (hydro)oxide. Such a requirement necessitates the anode material be made of precious metal to withstand the electrochemical oxidative dissolution, which could pose economic burden on the recycling operation or may introduce additional foreign metal ions to the cathode deposit.

To circumvent the need for strong acids, there are have been reported that some of the following solvents may be used as a medium to support SE reaction. Examples include deep eutectic solvent (DES) such as one containing choline chloride, and ionic liquid (IL) such as [MIm]HSO$_4$, [BSO$_3$HPy]HSO$_4$, [Bmim][PF$_6$], [CM-MIM][HSO$_4$], [Bmim]Cl, [Emim]Cl, [Bmin][BF$_4$], and [Bmim][PF$_6$] and the like. However, each of these solvents may possess several drawbacks. For instance, certain types of DES may have a high viscosity, which may hinder the formation of a uniform reaction mixture even with the aid of stirring during the SE reaction; whereas IL is generally costly and displays high environmental toxicity, which complicates their downstream disposal.

The invention seeks to eliminate or at least to mitigate such shortcomings for enhanced performance by providing a new or otherwise improved method for recovery of metal from waste such as waste printed circuit boards (WPCBs).

SUMMARY OF THE INVENTION

In a first aspect of the present invention, there is provided a metal recovery device for recovering metal in a waste printed circuit board by way of electrodeposition comprising:
 a cathode,
 an anode, and
 an electrolyte in electrical communication with the cathode and the anode,
 wherein the electrolyte comprises a glycol-based compound and a metal chloride. In an optional embodiment, the glycol-based compound is a petrochemical. Optionally, the glycol-based compound is a monomeric glycol, More optionally, the glycol-based compound is ethylene glycol. In an optional embodiment, the monomeric glycol is propylene glycol. In an optional embodiment, the anode comprises an anode material selected from a group consisting of porous carbon material, metal foam, conductive polymer foam and a combination thereof. Optionally, the porous carbon material is selected from a group consisting of reticulated vitreous carbon, carbon nanotube foam, graphene foam, graphite foam, carbon cloth, carbon paper and a combination thereof. In an optional embodiment, the anode being reticulated vitreous carbon with a porosity from about 10 ppi to about 100 ppi. Optionally, depth of the anode submerged in the electrolyte varies with the porosity of the anode. In an optional embodiment, the cathode comprises a cathode material selected from a group consisting of nickel, copper, iron, nickel foam, copper foam, aluminum foam, carbon cloth, carbon foam, and a combination thereof. It is optional that the cathode material is covered by a substantially porous structure. Optionally, the substantially porous structure has a porosity from about 100 mesh to about 200 mesh. Optionally, the substantially porous structure comprises a material selected from a group consisting of cotton cloth, porous carbon cloth, plastic cloth and a combination thereof. It is optional that the electrodeposition is conducted at a current density from about 0.2 mA cm$^{-2}$ to about 300 mA cm$^{-2}$. In an optional embodiment, the metal comprises heavy metal. Optionally, the heavy metal is copper. It is optional that the metal chloride is potassium chloride. In an optional embodiment, the electrolyte further comprises NH$_4$Cl. Optionally, the electrolyte is reusable for two or more electrodeposition cycles. Optionally, sensitivity of the device is between about 50% to about 60% in each electrodeposition cycle. It is optional that reuse of the electrolyte increases amount of metal recovered in each electrodeposition cycle. Optionally, the device has a sensitivity of about 60% when the electrolyte is being reused for three electrodeposition cycles. It is optional that cathodic Faradaic efficiency of the device in each electrodeposition cycle increases with number of cycles the electrolyte being reused. Optionally, the cathodic Faradaic efficiency of the device is at about 99%, when the electrolyte is being reused for three electrodeposition cycles. In an optional embodiment, the electrodeposition cycle has a metal selectivity of at least 50%. It is optional that the electrodeposition cycle has a metal recovery from about 26% to about 70%.

In a second aspect of the present invention, there is provided with a method of preparing an electrolyte for use in the metal recovery device in accordance with the first aspect for recovering metal by way of electrodeposition, comprising the steps of: a) mixing a glycol-based compound with a metal chloride to form a substantially pH-neutral mixture; and b) contacting the substantially pH-neutral mixture with a desirable amount of sample to form a slurry. In an optional embodiment, the method further comprises the step of preparing the sample by way of size reduction. Optionally, the size reduction comprising the step of blending the sample to powder form. It is optional that the powder form of the sample is of about 100 mesh to about 200 mesh. In an optional embodiment, concentration of the sample in the electrolyte is about 1 mg/L to about 25 mg/L.

In a third aspect of the present invention, there is provided with a method of metal recovery for recovering metal from waste printed circuit board by making use of the metal recovery device in accordance with the first aspect, comprising the step of: conducting a first electrodeposition cycle with a current of about 0.2 mA cm$^{-2}$ to about 300 mA cm$^{-2}$ for a cycle. In an optional embodiment, the electrodeposition is conducted at room temperature and atmospheric pressure. Optionally, the electrodeposition is conducted for at least 30 min. In an optional embodiment, the method further comprises the step of conducting a second electrodeposition cycle by reusing electrolyte of the first electrodeposition cycle. It is optional that amount of metal collected in the second electrodeposition cycle is higher than amount of metal collected in the first electrodeposition cycle. Optionally, the metal being recovered is selected from the group consisting of copper, cadmium, palladium, and a combination thereof.

BRIEF DESCRIPTION OF DRAWINGS

The patent or application file contains at least one drawing executed in color. Copies of this patent or patent application publication with color drawing(s) will be provided by the Office upon request and payment of the necessary fee.

The invention will now be more particularly described, by way of example only, with reference to the accompanying drawings, in which:

FIG. 3 is Table 1 which shows the metal composition of the stock WPCB powder analyzed by ICP-MS;

FIG. 5A is a graph that shows the concentration change of Cu in the electrolyte under different porosity grade of RVC and current setting of 10 mA;

FIG. 5B is a graph that shows the concentration change of Cu in the electrolyte under different porosity grade of RVC and current setting of 20 mA;

FIG. 5C is a graph that shows the concentration change of Cu in the electrolyte under different porosity grade of RVC and current setting of 30 mA;

FIG. 6 is Table 2 which shows the deposition, anode current efficiency and recovery rate of Cu on carious porosity RVC (10, 30, 60, and 100 ppi) and current settings (10, 20, and 30 mA);

FIG. 9 is Table 2 which shows the influence of solvent and supporting electrolyte on Cu dissolution and recovery. N.D.: Not detected;

FIG. 10 is Table 3 which shows conductivity and potential differences of different solvents and supporting electrolytes. Electrode distance was not optimized, but was maintained the same across all the tested electrolytes;

FIG. 12 is Table 4 which shows the influence of different metal dopants towards Cu recovery selectivity, with the following conditions: 150 μmot of CuCl$_2$ and 150 μmol of the metal dopant dissolved in 20 mL of EG with supporting electrolyte. The reaction was performed at the optimized concentration at 10 mA at room temperature using a 60 ppi RVC anode paired with a nickel cathode. N.D.: Not detected:

FIG. 13A shows a voltammogram of CV analysis of Cd$^{2+}$ with 150 μcool CdCl$_2$ in EG, with a supporting electrode, a RVC working electrode, and a piece of nickel working electrode. Scan rate: 100 mV s$^{-1}$;

FIG. 13B shows a voltammogram of CV analysis of Cd$^{2+}$ (150 μmol) with equal amount of Cu$^{2+}$ (150 μmol) in EG, with a supporting electrode, a RVC working electrode, and a piece of nickel working electrode. Scan rate: 100 mV s$^{-1}$;

FIG. 13C shows a voltammogram of CV analysis of Sn$^{2+}$ with 150 μmol SnCl$_2$ in EG, with a supporting electrode, a RVC working electrode, and a piece of nickel working electrode. Scan rate: 100 mV s$^{-1}$;

FIG. 16 is Table 5 which shows the potential difference between the two electrodes. Data was recorded during the 3$^{rd}$ trial of the electrolyte recycling experiment using WPCB powder, operating at 10 mA with a 60 ppi RVC anode and a nickel plate cathode:

FIG. 17 is Table 6 which shows the FE$_C$ % and all metal selectivity data using WPCB powder within 6 times EG reuse experiments:

FIG. 21 is Table 7 which shows the potential difference between the two electrodes. Data was recorded during scaled up experiment using 10 g of WPCB powder, operating at 200 mA with a large piece of 60 ppi RVC anode and a nickel plate cathode.

DETAILED DESCRIPTION OF OPTIONAL EMBODIMENT

As used herein, the forms "a". "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Without intending to be limited by theory, the inventor has, through their own research, trials, and experiments, devised a metal recovery system that is precious metal-free and requires only a small potential to enable the leaching and electrochemical cathodic recovery of at least one types of heavy metal from a sample at room temperature and atmospheric pressure. This may also be scaled up in an industrial setting easily.

The invention may be embodied as a metal recovery device, particularly a device comprising a glycol-based compound, such as ethylene glycol (EG) as the electrolyte. The inventor found that the use of glycol-based compound electrolyte, particularly EG electrolyte is advantageous as it is a cost-effective, chemically benign, pH-neutral, and recyclable solvent. In addition, such electrolyte may have a high chemical stability, a wide electrochemical window to commence the electrochemical redox of various metal components. Furthermore, the polyol electrolyte may not induce any precipitation of metal ions in the solution, and may be reused for multiple times without observable/detectable (electro)chemical degradation. Advantageously, with the use of such electrolyte, the inventor found that the device may selectively recover copper from WPCB powder over 12 different metals therein, and amount of copper deposition may increase each time when the electrolyte is reused.

According to the invention, there is provided a metal recovery device for recovery metal in a waste printed circuit board by way of electrodeposition comprising a cathode, an anode and an electrolyte in electrical communication with the cathode and the anode, wherein the electrolyte comprises a glycol-based compound and a metal chloride.

Figure 1B:
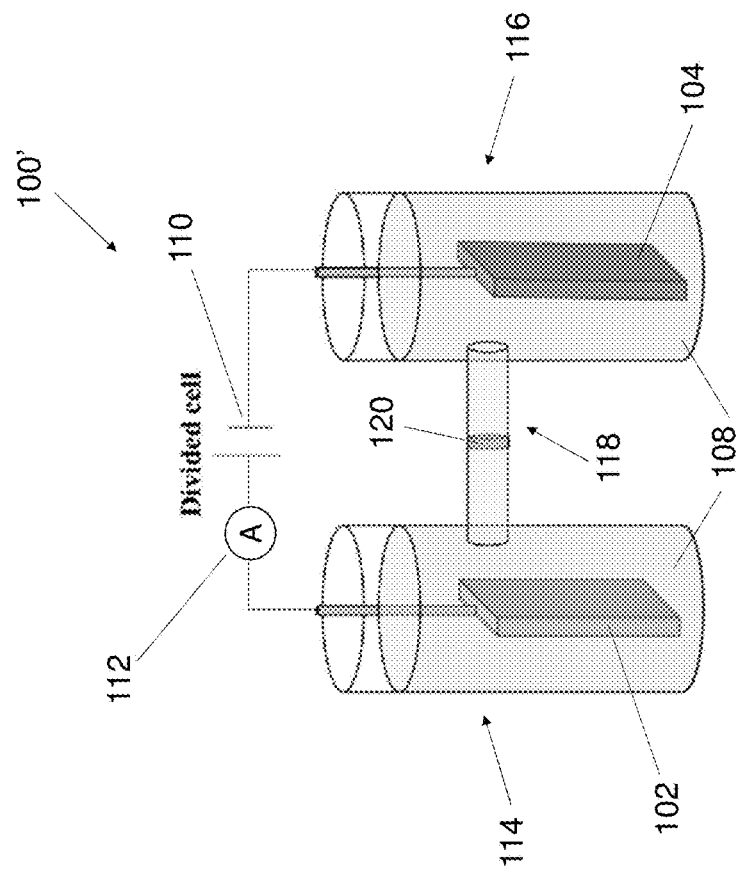
FIG. 1B shows a metal recovery device in accordance with another embodiment of the present invention.
Figure 1A:
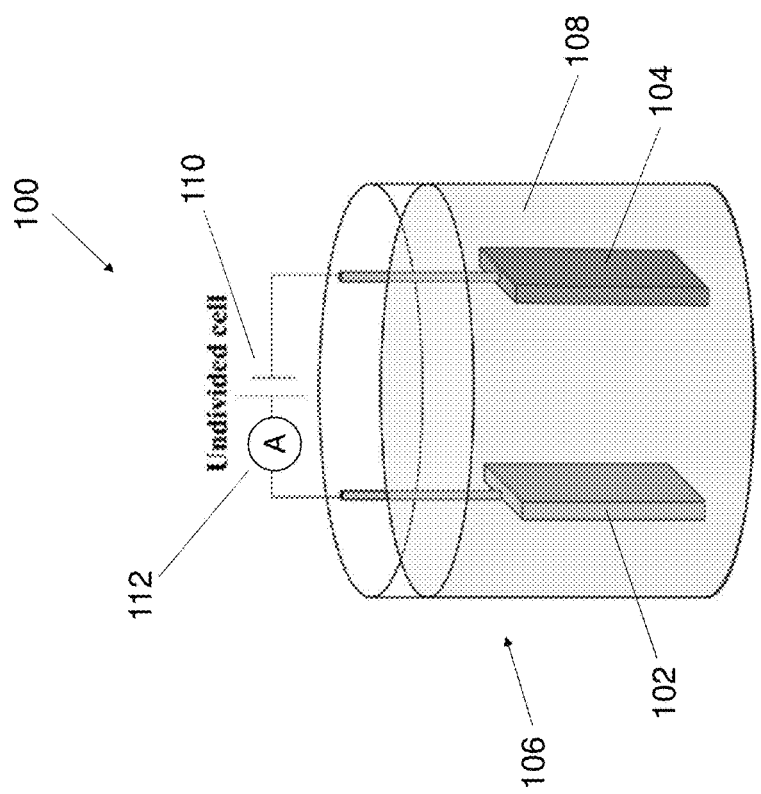
FIG. 1A shows a metal recovery device in accordance with an embodiment of the present invention.

In one embodiment, the metal recovery device may be configured in an undivided galvanostatic cell. With reference to FIG. 1A, there is shown an exemplary embodiment of a metal recovery device 100 configured in an undivided galvanostatic cell. The device lot) comprises an anode 102 and a cathode 104 being housed in the same chamber 106 containing an electrolyte 108. The anode and the cathode are immersed/submerged in the electrolyte and they are in electrical communication to each other via the connection of a DC power supply 110 and optionally an ammeter 112.

The anode may comprise a conductive material, particularly a conductive porous material that can capture the metal from a sample, such as a waste printed circuit board (WPCB), and allow the metal to be electrochemically oxidative dissolved into the electrolyte, and subsequently transferred to the cathodic side for reductive electrodeposition. In particular, the anode may comprise an anode material selected from the group consisting of porous carbon material, metal foam, conductive polymer foam and a combination thereof.

In an embodiment, the anode material may be a porous carbon material. The term "porous carbon material" generally denotes a porous structure formed by a web of carbon atoms or carbon atom-derived structures, such as carbon nanotubes, graphene, graphite and the like. In particular, the porous carbon material may be the one selected from the group consisting of reticulated vitreous carbon, carbon nanotube foam graphene foam, graphite foam, carbon cloth, carbon paper and a combination thereof.

In an embodiment, the anode material may be a metal foam. The term "metal foam" generally denotes a cellular structure consisting of a solid metal with gas-filled pores comprising a large portion of the volume. The metal foam may be further categorized into open-cell foam, closed-cell foam, stochastic foam, regular foam, and hybrid foam based on its pore arrangement and/or porosity as defined in the art. In particular, the metal foam may be selected from the group consisting of nickel foam, copper foam, aluminum foam and a combination thereof.

In an embodiment, the anode material may be a conductive polymer foam. The term "conductive polymer foam" generally denotes a porous structure formed by one or more of a conductive polymer and/or a copolymer thereof. Examples of conductive polymer may include polyacetylene (PA), polyaniline (PANT), polypyrrole (PPy), poly(3,4-ethylenedioxythiophene): poly(styrenesulfonate) (PEDOT: PSS), polythiophene (PTH), poly(para-phenylene) (PPP), poly(phenylenevinylene) (PPV), and polyfuran (PF). The conductive polymer foam may or may not coated with an additional conductive material such as graphite, graphene, carbon cloth, etc. Alternatively, the term "conductive polymer foam" may further denote a porous structure formed by one or more of a non-conductive polymer and/or a copolymer thereof, coated with a conductive material such as graphite, graphene, carbon cloth, etc.

Optionally, the anode may comprise an anode material being reticulated vitreous carbon (RVC). RVC is a type of conductive carbonaceous foam that is available in various porosity. It is available in three-dimensional shape, and its pores exhibit a honeycomb arrangement. The inventor found that such a porous skeletal structure is particularly effective to induce electrochemical contact with the metal in WPCB, particularly when the metal and/or WPCB is in powder form. The porosity of RVC may be various. In an embodiment, the RVC may have a porosity from about 10 pore-per-inch (ppi) to about 100 ppi. That said, in such embodiment, the anode is porous and with a porosity from about 10 ppi to about 100 ppi.

The anode may be submerged in the electrolyte with a depth variable with the porosity of the anode (i.e. the submersion depth of the anode in the electrolyte may be adjusted according to its porosity). The inventor found that such a depth adjustment is particularly advantageous when an anode material having a surface area (i.e. the electroactive area) that is proportional to its porosity. For example, when an anode of particular porosity is not (commercially) available, one could still achieve a substantially the same electroactive area for example 50 cm$^2$, and therefore the metal recovery result, from anodes of different porosity via the submersion depth adjustment.

The cathode may comprise a cathode material selected from the group consisting of nickel, copper, iron, nickel foam, copper foam, aluminum foam, carbon cloth, carbon foam, and a combination thereof. In one embodiment, the cathode material may be a nickel plate. In another embodiment, the cathode material may be a copper plate. In either of the above embodiment, it is appreciated that a person skilled in the art could recognize to modify the cathode material in shapes other than a plate to meet their practical needs.

In one embodiment, the cathode material may be covered by a substantially porous structure, which may act as a filter for the cathode material. The substantially porous structure is particularly useful when the sample (metal or metal in WPCB) is in powder form inasmuch as the substantially porous structure may prevent the sample powder from adhering on the cathode, affecting the electrodeposition conducted thereon.

The porosity as well as the material of the substantially porous structure may be selected according to practical needs of a person skilled in the art. As an exemplary embodiment, it is optional that the substantially porous structure has a porosity from about 100 mesh to about 200 mesh. It is also optional that the substantially porous structure comprises a material selected from a group consisting of cotton cloth, porous carbon cloth, plastic cloth and a combination thereof.

The substantially porous structure may be configured in various forms. In one embodiment, the structure may be configured as a plastic tube with two open ends, with one end (the end immersed in the electrolyte) covered with a porous cloth as mentioned above. The plastic tube therefore forms a compartment enclosing the cathode material therein, or in other words, the cathode material acts like a core of the plastic tube. In another example, the substantially porous structure may be configured as a bag comprising cotton cloth. The cathode material may be kept inside the bag and therefore is prevented from adhesion of the sample powder during the electrodeposition process.

The electrolyte of the device may comprise a glycol-based compound and a metal chloride. The term "glycol-based compound" as used herein may refer to one or more of monomeric glycol present in the electrolyte. In an embodiment, the glycol-based compound may be a monomeric glycol. The terms "monomeric glycol" or "monomeric glycol unit" as used herein generally denote a glycol monomer comprising two hydroxyl groups occupying vicinal positions, i.e. they are attached to adjacent carbon atoms; or in other words, a vicinal diol. The monomeric glycol may comprises 2 to 6 carbon atoms. For example, the monomeric glycol may be ethylene glycol, propylene glycol (propane-1,2-diol), α-butylene glycol (butane-1,2-diol), 2,3-butylene glycol (2,3-butanediol), pentylene glycol (pentane-1,2-diol), cyclohexane-1,2-diol and the like. In an optional embodiment, the monomeric glycol is ethylene glycol. In another optional embodiment, the monomeric glycol is propylene glycol.

In one embodiment, the glycol-based compound may be a petrochemical. The term "petrochemical" or "petchem" refers to a chemical product obtained or derived from petroleum or its derivatives (such as natural gas, coal, etc.) by refining and/or by any subsequent reaction(s) thereof. For example, in an embodiment where the glycol-based compound is ethylene glycol, it may be derived from ethylene that is manufactured from natural gas via oil refineries, followed by ethylene oxidation and ethylene oxide hydration. Thus, it is advantageous that the electrolyte of the present invention may strengthen the role of biorefinery in the present oil refinery-dominated economy.

During the metal recovery process, the glycol-based compound may act as a chelating agent to chelate the metal ions in the sample and form complex therewith in the presence of the metal chloride, such that the metal ions are kept from precipitating and their transport to the cathode for electrochemical deposition is facilitated.

The metal chloride optionally is potassium chloride. In addition to the role of being a supporting electrolyte, the metal chloride is important in maximizing the anodic oxidative leaching and cathodic reductive deposition of the metal to be recovered. In particular, the inventor found that mainly it is potassium chloride that could prevent metal precipitation while maintain the metal ion available for electrochemical deposition. The mechanism will be discussed in later part of the disclosure.

In an embodiment, the electrolyte may further includes $NH_4Cl$ as an additional component of the supporting electrolyte. In particular, the $NH_4Cl$ may increase the conductivity of the electrolyte thereby reducing the operating voltage of the device.

Additionally or optionally, the device 100 may further includes a stirrer such as a mechanical stirrer, a magnetic stirrer and the like, facilitating a uniform distribution of the metal/metal ion in the electrolyte upon recovery process.

In an alternative embodiment, the metal recovery device may be configured in a divided galvanostatic cell. With reference to FIG. 1B, there is provided an exemplary embodiment of a metal recovery device 100' configured in a divided galvanostatic cell. Similar to device 100, device 100' comprises an anode 102, a cathode 104 and an electrolyte 108 that is in electrical communication with the anode and the cathode via the connection of DC power supply 110 and optionally an ammeter 112, except each of the anode and the cathode is respectively housed in a separate chamber 114, 116. The chambers are in fluidic communication via a channel 118 with a sieve 120 configured concentrically inside the channel. Each chamber is filled with the electrolyte, to which the anode and the cathode are immersed.

In this embodiment, in particular, the sample to be recovered may only contact with the anode instead of both the anode and cathode as in the undivided cell configuration mentioned above. That said, the electrolyte on the anodic side (i.e. the electrolyte in chamber 114) may further include the sample to be recovered. As such, any metal in the sample may undergo oxidative dissolution to form metal ions in the chamber 114, and the ions are subsequently transferred to the cathodic chamber 116 for electrodeposition.

The sieve 120, in addition being a salt bridge of the device 100', may act as a filter to prevent any unreacted sample, particularly unreacted sample powder from entering the cathodic chamber 116 and adhering to the cathode during the recovery process. In an embodiment, the sieve 120 may be a semi-permeable membrane, such as a cation-exchange membrane (CEM), which substantially allows particular cations (such as the desired metal ions from the anodic chamber 114) to pass through.

Additionally or optionally, the device 100' may further includes a stirrer such as a mechanical stirrer, a magnetic stirrer and the like in each of the chambers 114 and 116, facilitating a uniform distribution of the metal/metal ion in the electrolyte upon recovery process.

The metal recovery device 100/100' is particularly useful for recovering heavy metal such as copper, cadmium, palladium and the like. Optionally, the device may be used for recovering copper.

In an embodiment, the device may be used for recovering copper from a WPCB. In operation, it may commence with preparing an electrolyte for use in the device, by step a) of mixing the glycol-based compound with the metal chloride to form a substantially pH-neutral mixture, and step b) of contacting the substantially pH-neutral mixture with a desirable amount of sample to form a slurry. The phrase "substantially pH-neutral" generally denotes that the pH of the (resultant) mixture of glycol-based compound and metal chloride is from about 6.8 to about 7.2, from about 6.8 to about 7.15, from about 6.85 to about 7.2, from about 6.9 to about 7.1, from about 6.95 to about 7.1, particularly from about 6.98 to about 7.05 or optionally about 7.

The sample (i.e. the WPCB containing copper) may be processed by way of size reduction prior to adding to the substantially pH-neutral mixture. In particular, the size reduction may be conducted by blending the sample to powder form. In an embodiment, the sample may be blended to powder form having a size of about 100 mesh to about 200 mesh. It is appreciated that the blending step may be done any technical means in the art as long as it could achieve the desired powder size. For example, the blending step may be conducted by an electrical blender.

The phrase "desirable amount" refers to an amount/concentration of the sample that a person skilled in the art intended to add to the device for metal recovery and/or the maximum amount/concentration of sample that may load to the device for metal recovery (i.e. loading capacity of the device). In an embodiment, the concentration of the sample may be from about 1 mg/L to about 25 mg/L.

The recovery process may be conducted by way of electrodeposition, optionally conducted at room temperature and atmospheric pressure. The electrodeposition may be conducted with one or more cycles depending on practical needs, such as 1 to 6 cycles. For each cycle of the electrodeposition, it may be conducted with a current density of about 0.2 mA cm$^{-2}$ to about 300 mA cm$^{-2}$. The electrodeposition time may vary, depending on the current density (or current flow) to deliver sufficient coulomb to oxidize all the Cu metal powder (Cu→Cu$^{2+}$+2e) or the Cu content in the WPCB powder. In an embodiment, the electrodeposition may be conducted for at least 30 min.

In an embodiment, where the electrodeposition is conducted for two or more cycles, the recovery process may further comprise the step of conducting the second electrodeposition cycle by reusing electrolyte of the first electrodeposition cycle. In particular, the electrolyte of the first electrodeposition cycle may be reused in a consecutive manner. That is, the electrolyte of the first electrodeposition cycle is reused for the (subsequent) second electrodeposition cycle without any replenishment of new electrolyte or with only a negligible amount of replenishment of new electrolyte.

In an embodiment, the electrolyte may be reusable for two or more electrodeposition cycles. The phrase "reusable" generally refers to the electrolyte to have one or more of the following properties after each of the electrodeposition cycle: the selectivity of the device remains to be at least 50%; the electrodeposition cycle has a metal recovery from about 26% to about 70%; the cathodic Faradaic efficiency of the device remains to be at least about 80%.

In particular, the sensitivity of the device may be between about 50% to about 60% in each electrodeposition cycle. In an embodiment, the device may have a sensitivity of about 60% when the electrolyte is being reused for three electrodeposition cycles.

Other than the electrolyte being reusable, the inventor unexpectedly found that amount of metal recovered in each electrodeposition cycle increases, when the electrolyte is being reused in the electrodeposition cycles. For example, in an embodiment where the metal is copper, the amount of metal collected in the second electrodeposition cycle may be higher than amount of metal collected in the first electrodeposition cycle. The inventor found that such an unexpected result may be attributed to an unexpected increase of cathodic Faradaic efficiency of the device in each electrodeposition cycle with number of cycles the electrolyte being reused. For example, in an embodiment, the cathodic Faradaic efficiency of the device may be at about 80% when the electrolyte is being reused for two electrodeposition cycles, and the cathodic Faradaic efficiency increases to at least about 99% when the electrolyte is being reused for three electrodeposition cycles.

EXAMPLES

Materials, Chemicals

The investigation on various electrochemical parameters was conducted with metallic Cu powder (Shanghai Aladdin, CP, 99.9%, 100 mesh). Unless specified otherwise, the electrolyte solution consisted of 40 mL EG (Shanghai Aladdin, 99%) and with 0.23 g NH$_4$Cl (Sinopharm, CP, 99.5%), 0.20 g KCl (Sinopharm, CP, 99.5%) as supporting electrolyte. After each electrolysis experiment, all samples were diluted with 2% HNO$_3$ (Honeywell, AR, 65%) until the metal concentration reached parts-per-billion (ppb) level for ICP-MS analysis. H$_2$SO$_4$ (BDH Chemicals, AR, 95%), 1,2-propanediol (Aladdin, ACS, ≥99.5%), methanol (Duksan, gradient), choline chloride (Aladdin, AR, 98%), Na$_2$SO$_4$ (Fisher Chemical, AR, X99.5%) and NaHCO$_3$(Aladdin, AR, 99.8%) are used to examine the influence of solvent and supporting electrolyte on Cu dissolution and recovery. CuCl$_2$ (Aladdin, AR, 99.99%), CdCl$_2$ (Acros Chemicals, AR, 98%, anhydrous), SnCl$_2$ (Aladdin, AR, 99%, anhydrous). CrCl$_3$·6H$_2$O (Aladdin, AR, 98%), PdNO$_3$·2H$_2$O (Macklin, ACS, Pd≥39.0%) and AgNO$_3$ (Aladdin, AR, 99.8%) are used to perform various control experiments. Unless specified other, the cathode was a Ni plate (Shijiazhuang Zhongyan Metal Material Technology, Co., Ltd), which was selected to distinguish the Cu deposit during the analysis, and the anode was a RVC electrode (ERG, Aerospace, Corp). The Cu-deposited Ni cathode was dissolved in aqua regia (HCl, Duksan pure, AR, 35%-37% and HNO$_3$, Honeywell, AR, 65%) to quantify the amount of Cu and other metals via ICP-MS.

Methods and Characterization

Reaction Cell Construction

Figure 1D:
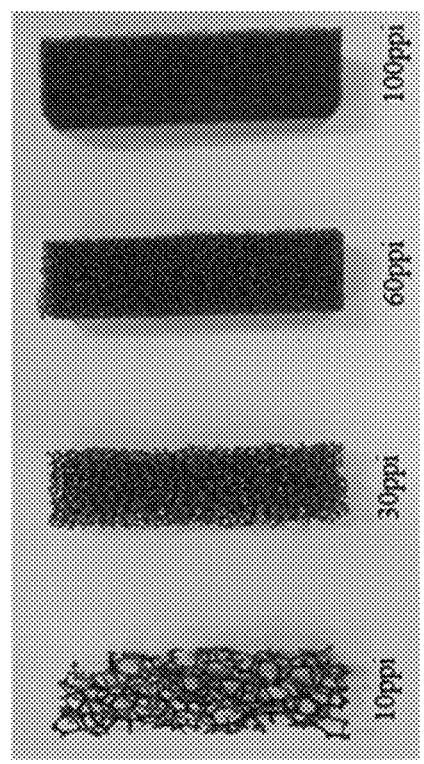
FIG. 1D shows a reticulated vitreous carbon (RVC) anode at different porosities, measured in pores-per-inch (ppi)
Figure 1C:
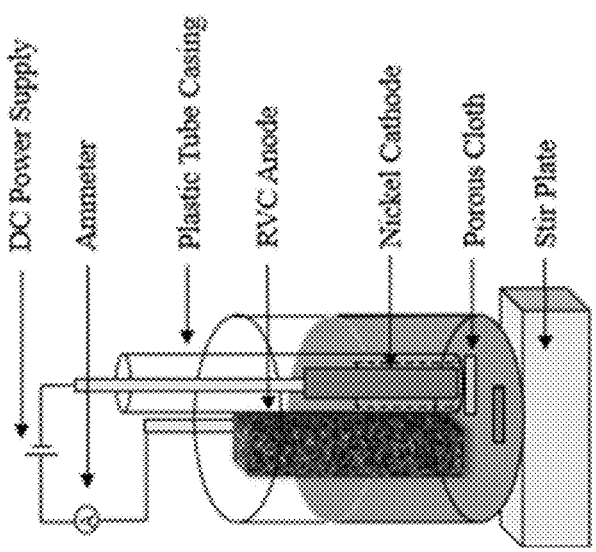
FIG. 1C shows an experimental setup of the slurry electrolysis (SE) reaction.
Figure 2:
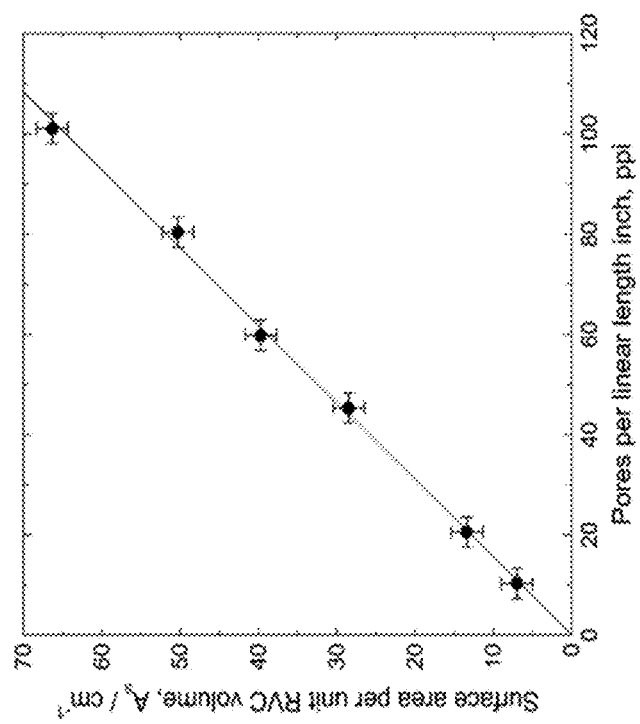
FIG. 2 is a graph that shows the electrode area per unit electrode volume vs. porosity grade of RVC.

All SE experiments were conducted galvanostatically in an undivided cell using an RVC anode and a nickel strip cathode at room temperature and ambient pressure. A direct current (DC) power supply (Itech Electronic) was used in all the SE experiments. With reference to FIG. 1C, the cathode compartment was constructed with a plastic capsule with an open end covered by a porous cloth. Four porosity grades of RVC (10, 30, 60, and 100 pores-per-inch, ppi. FIG. 1D) were examined for their effectiveness to induce Cu oxidation under different current flows 10, 20, and 30 mA. The exposed dimension of the RVC electrode was set to be 10×5×X mm, where X mm is the depth of the electrode submerged to the solution. This depth varied to compensate for the surface-to-area ratio difference between the different porosity grades (FIG. 2). The RVC electrode electroactive area was standardized to be about 50 cm$^2$, which yielded the current of about 0.2, 0.4, and 0.6 mA cm$^{-2}$ for the 10, 20, and 30 mA trials, respectively. After each experiment, the cell was dismantled and cleaned with distilled water. Reaction duration was based on the current flow (current density) to deliver sufficient coulomb to oxidize all the Cu metal powder (Cu→Cu$^{2+}$+2e) or the estimated Cu content in the WPCB powder.

The pre- and post-reaction electrodes surface morphology was examined with scanning electron microscope (SEM). The pre- and post-reaction EG electrolyte was examined using high-pressure liquid chromatography coupled with a reflective index detector (HPLC-RI).

System Efficiency Evaluation Using Cu Metal Powder

Prior to examining the real WPCB sample, Cu metal powder was employed as a model substrate to assess the influence of various experimental parameters, including current density, RVC porosity, and solvent composition, on the cathodic recovery of Cu and the Faradaic efficiency of the anode (FE$_A$ %) and cathode (FEC %) reactions. Periodic samples of 0.1 mL of electrolyte were collected and filtered to monitor the concentration change of Cu$^{2+}$ ions in the electrolyte to assess the electrochemical dissolution of the Cu powder. After each reaction, the nickel cathode, which contained the Cu deposit, was dissolved in 10 mL of aqua regia. All reaction samples were diluted by 104 times with 2% HNO$_3$ until the Cu concentration reached ppb level before the ICP-MS analysis. After each experiment, the RVC electrodes were cleaned by pure water and ethanol, and stored in 6 M HCl solution for 24 h before reuse. All experiments contained an initial (To) sample to ensure no Cu (or WPCB) powder was carried over from the previous trial. The Faradaic efficiency FE$_{(A,C)}$ was calculated based on the amount of Cu oxidized or reduced, which was quantified by ICP-MS, using equation (Bald'e et al., 2017):

$$FE_{(A,C)}\% = \frac{(2 \times F \times \text{Mol}_M)}{C_{Total}} \times 100\% \qquad \text{Eq. 1}$$

where Mol$_M$ is the mole of the electrochemically oxidized or reduced metal (M); F is Faraday's constant, 96,485 C mol$^{-1}$; Craw is the total amount of charge passed during the SE trial.

Cyclic Voltammetry (CV) Analysis

Cyclic Voltammetry (CV) analysis of the Cu was conducted with a RVC working electrode in 20 mL of EG with supporting electrolyte (NH$_4$Cl and KCl), using an electrochemical station (CH Instrument, 660E). The electrochemical influences of metal ions were assessed by conducting the CV in the absence and presence of specific metal ions within the electrochemical window before gas evolution at the scan rate of 100 mV s$^{-1}$.

Recovery of Ethylene Glycol

The electrochemical stability of EG was assessed by reusing the electrolyte solution after each SE experiment. The conductivity, metal ion concentration, and EG volume were monitored between each trial. If the starting volume of the subsequent trial was less than its preceding trial, new EG with the dissolved supporting electrolyte was added to reset the volume. After each reaction, the EG solution was also filtered to remove any residual powder, such as WPCBs or Cu metal, before it is reused. Each post-electrolysis EG was also analyzed by HPLC-RI to identify possible chemical composition changes of the EG.

WPCB Powder Preparation and Slurry Electrolysis

The WPCB samples scraps (average size of 3×3×2 mm of the pieces) were donated by a local e-waste recycling vendor, and the samples were further blended into powders sizes of 100-200 mesh using an electrical blender. The mesh size was determined by filtering the powder through a range of mesh sieves. Approximately 15% of the powder was between 50 and 100 mesh, 50% was between 100 and 200 mesh, and 35% was smaller than 200 mesh. The WPCB powder was stored in ambient conditions until use. The powder was used for the SE study in the same manner as the Cu metal powder, where the powder was circulated freely in the RVC electrode compartment. For the metal composition analysis, 1 g of WPCB was dissolved in aqua regia, then diluted with 2% HNO$_{3(aq)}$ prior to ICP-MS analysis (FIG. 3).

Example 1

Influence of Current Flow and Electrode Porosity on Cu Recovery Efficiency

Figure 4:
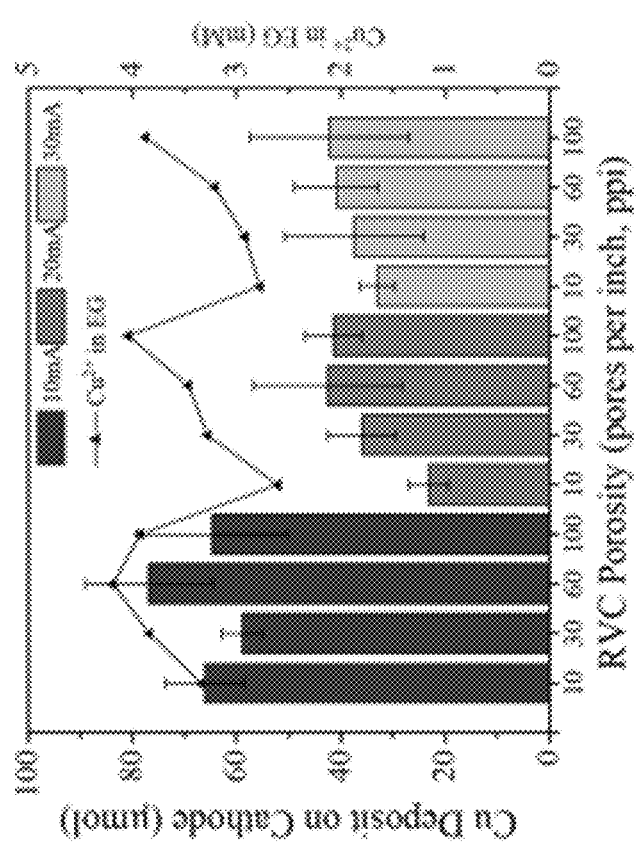
FIG. 4 is a graph that shows the dissolution and recovery of Cu on various porosities of RVC (10, 30, 60, and 100 ppi) and current settings (10, 20, and 30 mA)

The influence of RVC porosity on the oxidative dissolution of Cu powder was investigated at different current settings. The reaction duration was adjusted based on the current flow to deliver 100% coulomb charge to oxidize all 20 mg of Cu powder, assuming the reaction had perfect FE for Cu oxidation (Cu→Cu$^{2+}$+2e). As shown in the bar chart of FIG. 4, all three current settings (10, 20, and 30 mA) displayed a similar Cu oxidation pattern; where the higher porosity improved the electrochemical oxidation of Cu to generate more Cu$^{2+}$ ions in the electrolyte (FIG. 4, line chart). The finer pores captured and retained the Cu powder more efficiently and thus facilitated its electrochemical oxidation. The change in Cu$^{2+}$ during the SE reaction was also monitored in each trial. It was observed that the greater ppi RVC electrodes could promote a greater growth rate of $Cu^{2+}$ ion in the electrolyte, confirming the finer pores could benefit the oxidative dissolution of Cu (FIGS. 5A to 5C).

Figure 7B:
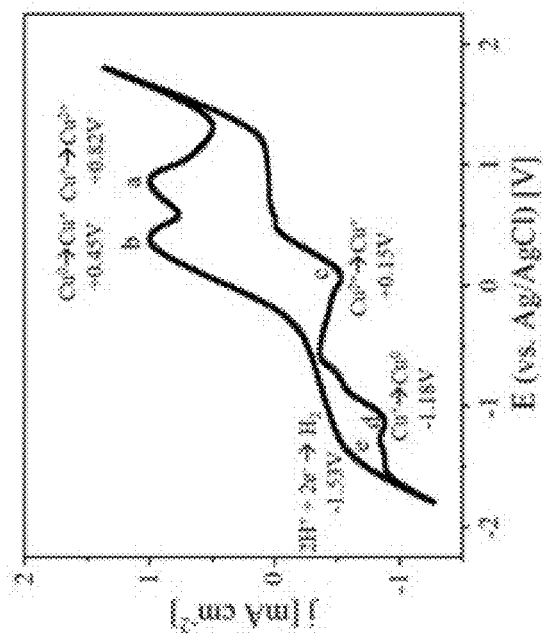
FIG. 7B is a graph that shows the CV analysis of 40 mM CuSO$_4$ as Cu$^{2+}$ ion in EG with supporting electrolyte (Scan rate: 100 mV s$^{-1}$) using a RVC working electrode with 0.625 cm$^{-2}$ surface area.
Figure 7A:
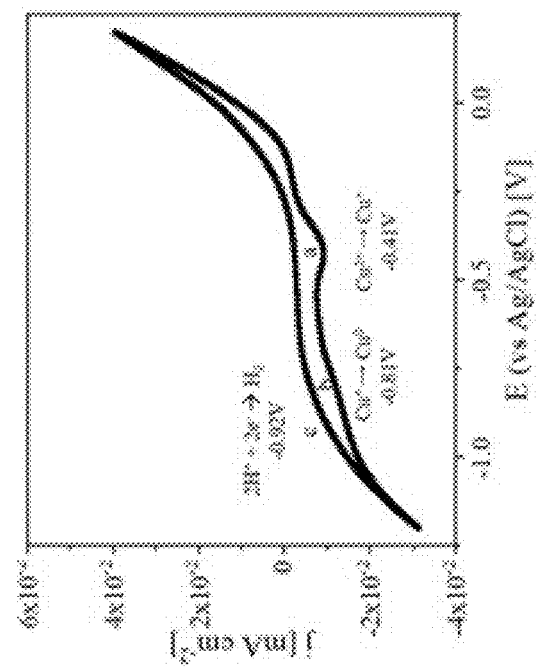
FIG. 7A is a graph that shows the cyclic voltammetry (CV) analysis of 40 mM CuSO$_4$ as Cu$^{2+}$ ion in EG with supporting electrolyte (Scan rate: 100 mV s$^{-1}$) using a nickel plate working electrode with 0.625 cm$^{-2}$ surface area.

As for the influence of current density, a greater amount of Cu deposit was observed for the 10-mA trials (FIG. 4, dark bar chart) compared with the 20 and 30 mA trials (FIG. 4, grey and light grey bar charts), even though the $Cu^{2+}$ ions concentration were comparable across the electrodes with the same porosity (FIG. 4, line chart). Thus, it can be said that the current flow did not affect the oxidative dissolution of Cu, but the Cu deposition efficiency (FIG. 6). The lower Cu recovery at the 20 and 30 mA settings suggested that the cathodic reduction of $Cu^{24}$ could be competing with $H_2$ evolution reaction (HER), which was resulted from the electrochemical reduction of $H^+$ in the electrolyte. The working potentials of the Ni cathode during the 10, 20, and 30 mA SE reaction were measured, and their corresponding working potentials were $-1.72, -1.86, -1.97$ V vs. Ag/AgCl, respectively. CV analysis in the presence of 40 mM $CuSO_4$ as a $Cu^{2+}$ source using a Ni working electrode was conducted. As shown in FIG. 7A, it can be seen that the $-1.86$ V and $-1.97$ V, which corresponded to the 20 and 30 mA current flow, respectively, have significantly exceeded the HER onset potential. The CV analysis confirmed that $H_2$ evolution was competing severely with the reduction of $Cu^{24}$ ions for the Faradaic electron transfer at the 20 and 30 mA settings.

The anodic working voltage was also measured for the RVC anode during the 10, 20, and 30 mA trials, corresponding to $+1.18, +1.33,$ and $+1.45$ V vs. Ag/AgCl, respectively. As shown in FIG. 7B, all three current settings generated anodic working potential above the oxidation of Cu species at $+0.82$ V vs. Ag/AgCl, confirming that the RVC anode was responsible for the electrochemical oxidation of Cu.

Figure 8B:
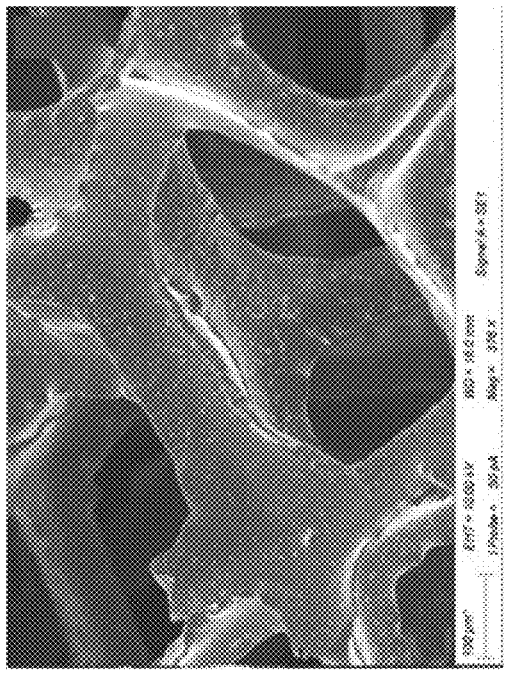
FIG. 8B shows the SEM micrograph of post-reaction electrode surface of 60 ppi RVC in a scale of 100 μm.
Figure 8D:
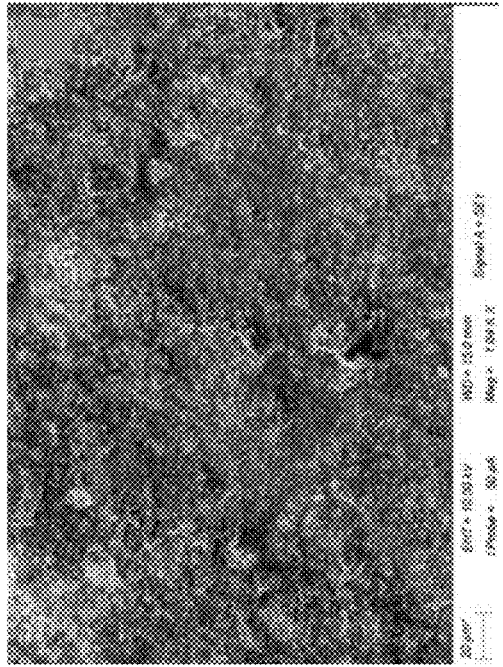
FIG. 8D shows the SEM micrograph of post-reaction electrode surface of nickel in a scale of 20 μm.
Figure 8A:
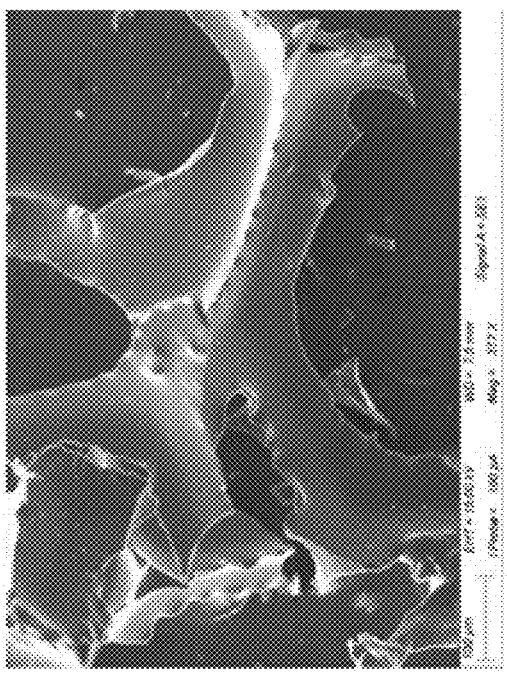
FIG. 8A shows the scanning electron microscopy (SEM) micrograph of pre-reaction electrode surface of 60 ppi RVC in a scale of 100 μm.
Figure 8C:
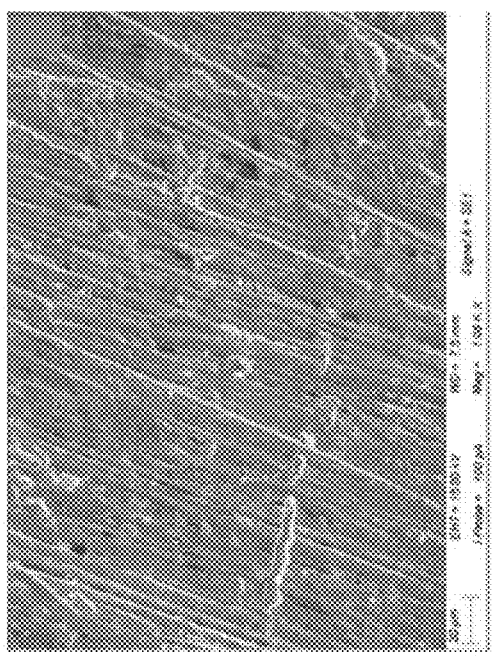
FIG. 8C shows the SEM micrograph of pre-reaction electrode surface of nickel in a scale of 20 μm.

The surface morphologies of the electrodes were also examined at the pre- and post-reaction stage. SEM analysis showed that the structural integrity of RVC anode was well-maintained after the reaction. As shown in FIGS. 8A and 8B, there was a trace amount of crystals on the surface, which was resulted from the crystallization of the supporting electrolytes crystalized during the drying process. The Ni cathode surface was coated with a rough layer of dark brown Cu (FIGS. 8C and 8D). The rough deposition of Cu was resulted from the low conductivity of the electrolyte, and the low concentration of the $Cu^{2+}$ ions.

The results revealed the porosity of RVC played a key role in the electrochemical oxidative dissolution of Cu. Finer pores promoted the capture and electrochemical oxidation of Cu. The current settings did not affect the electrochemical oxidation of Cu but the deposition of $Cu^{24}$ ions on the cathode. The lowest current setting at 10 mA offered the best electrodeposition of Cu compared to the 20 and 30 mA settings (FIG. 4, dark grey bar chart). CV analysis revealed that the working potentials at the 20 and 30 mA exceeded the HER onset overpotential, which triggered the formation of $H_2$ to compete with the Cu deposition.

Based on the results from the Cu powder, which was employed as a surrogate of WPCB powder, the 60 ppi RVC operating at 10 mA was identified as the optimal setting for Cu electrochemical leaching and recovery. In addition to the better dissolution of Cu, the 60 ppi may be more suitable for the subsequent WPCB powder study than the 100 ppi, because the pores of the 100 ppi electrode were too small, which would likely induce clogging by the plastic remnants from the real WPCB powder. Thus, the 60 ppi RVC electrodes operating at 10 mA was applied for the subsequent studies.

Example 2

Effect of Electrolyte Towards Cu Recovery

Several other solvents besides EG were also examined for their performance to induce Cu dissolution and deposition in SE. Four different solvent compositions (neutral water, methanol, pH 1 $H_2SO_4$, propylene glycol-PG) were examined and compared with EG. As shown in FIG. 9, water and methanol did not yield any Cu deposition on the cathode, and the formation of Cu oxide precipitate was observed. The amount of Cu oxide precipitation was significantly reduced when water was acidified to pH 1 with $H_2SO_4$. Still, a small amount of Cu oxide precipitate was observed in the midst of Cu metal circulation. It is also worth noting that the pH 1 $H_2SO_4$ electrolyte promoted a substantial amount of $H_2$ evolution, which led to a poor recovery of Cu. In both aqueous electrolytes, severe $O_2$ evolution was observed on the RVC anode. The liquid-gas barrier hindered the contact between the Cu powder and the electrode pores, which reduced the efficiency of Cu oxidation. The formation of Cu oxide also decreased the amount of $Cu^{2+}$ ion available for electrodeposition.

Beyond the aqueous electrolyte, 0.1 M choline chloride in EG was also examined to mitigate the formation of Cu oxide. The post-reaction electrolyte solution displayed a transparent green color, indicating the presence of $Cu^{2+}$ ion, with no observable amount of Cu oxide. However, only a small quantity of Cu deposits could be detected on the cathode. The poor recovery of Cu in choline chloride might result from the possible complexation between $Cu^{2+}$ ion and the choline to form Cu (choline)$Cl_3$ crystal, which could have shifted the reduction potential to a more negative potential. Even in the presence of, for example, 1.4 mM KCl and 2.2 mM $NH_4Cl$, the improvement on amount of Cu deposits on the cathode was found to be minimal (data not shown). It may be attributed to the much higher concentration of choline chloride compared with the supporting electrolyte (KCl and $NH_4Cl$).

As shown in FIG. 9, the glycol electrolytes (PG and EG) performed better than the rest of the electrolytes in terms of cathodic Cu deposition. Both glycol electrolytes have good chelating relationships with $Cu^{2+}$ and group I and II metal ions. In the presence of $Cl^-$ anion, $Cu^{2+}$ ion chelates with EG to afford Cu-glycol chelate complexes. $Cu(EG)_3^{2+}$ and $Cu(EG)Cl_2$. The chelation kept the $Cu^{24}$ ions from precipitating and facilitated its transport to the cathode surface for electrochemical deposition.

It is noted that, first, the amount of Cu deposition was greatly influenced by the $Cu^{2+}$ ion availability in the electrolyte. Second, a higher electrolyte conductivity could reduce the operating voltage of the cell (FIG. 10) but did not improve the Cu deposition. Thus, the protic solvents, such as water or methanol, which were better at dissolving the supporting electrolytes, did not necessarily improve the electrochemical leaching and recovery of Cu. In fact, they both induced Cu precipitation and prevented the electrochemical deposition of $Cu^{2+}$ ions. Third, cation from the electrolyte also played an important role in Cu recovery. No Cu deposition was observed when KCl was substituted with NaCl: all the cathodic Faradaic current was spent on $H_2$ evolution instead. It appears that $Na^+$ reduced the availability of the $Cu^{2+}$ while increased the availability of $H^4$ from EG.

The experimental observation agreed with a computational study on polyethylene glycol (PEG), in which the presence of an alkali metal could promote the binding energy between metal ions, $Cu^{2+}$ in this case, with the PEG in the absence of water. The promotional trend increased from $Li^+>Na^+>K^+$ ion. The stronger complexation for the EG with $Na^+$ could have reduced the amount of $Cu^{2+}$ available for electrochemical deposition and diverted the reaction selectivity to $H_2$ evolution instead. It is also worth noting that $Cl^-$ also had a considerable impact on PEG adsorption on the Cu electrode surface. Spectroscopic evidence demonstrated the formation of a PEG-Cu-Cl complex.

In summary, the key factor in maximizing the oxidative leaching and the reductive deposition of the metal component was the supporting electrolyte's property to prevent the metal precipitation while maintaining the metal ion available for electrochemical deposition. The conductivity and ionic property of the electrolyte could reduce the resistivity of the system but had a limited contribution to Cu recovery on the cathode.

Figure 11B:
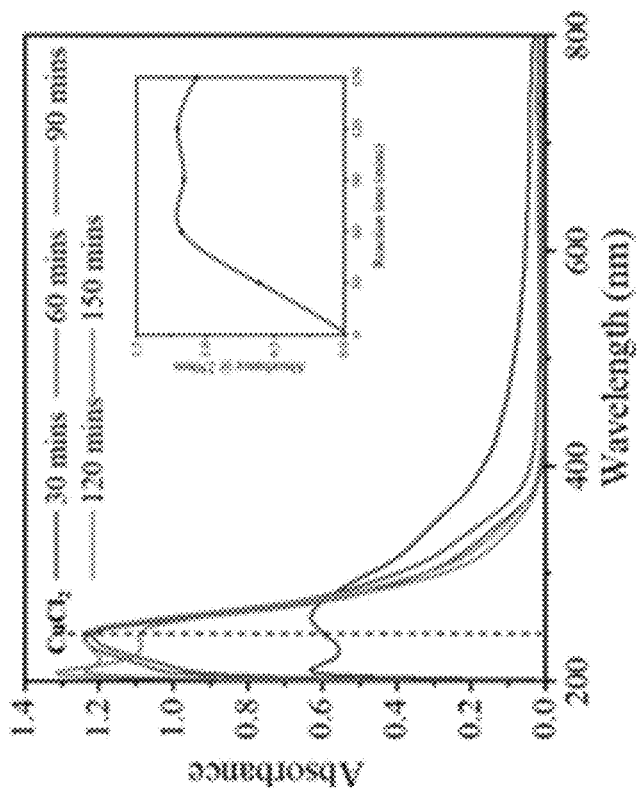
FIG. 11B shows a graph of absorbance vs wavelength corresponding to the electrolysis reaction of FIG. 11A. The insert shows a graph of the concentration of CuCl$_2$ monitored at λ=242 nm from $T_0$ to $T_{150}$.
Figure 11A:
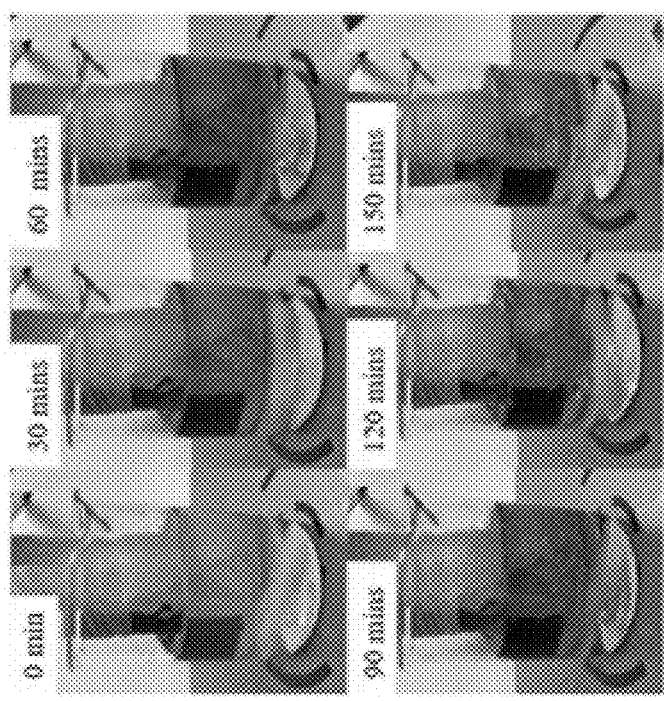
FIG. 11A shows the color change of the electrolysis reaction from $T_0$ to $T_{150}$.

Considering that EG was the most effective solvent to induce the electrochemical leaching and recovery of Cu, we studied the spectroscopic change of the solution throughout the first 150 min of the reaction, during which the color change was the most obvious. As shown in FIG. 11A, the solution was light brown at $T_0$ because of the Cu metal powder suspension. After 30 min of electrolysis, the solution turned green due to the oxidation of $Cu^{2+}$ to $Cu^{2+}$ to yield $CuCl_2$, which had a lambda max ($\lambda_{max}$) between 250 and 262 nm depending on the ratio between $Cu^{2+}$ and $Cl^-$ ions (FIG. 11B). The amount of $Cu^{2+}$ entered a steady-state between 60 and 120 min and began to decline due to the deposition and depletion of Cu ions in the slurry mixture.

Example 3

Influence of Metal Dopant on Copper Recovery

General PCB samples contain a variable amount of Cd, Sn, and Cr depending on their internal components. For example, Sn is the main component of lead-free solder, which became increasingly popular with the restriction of Pb. It typically constitutes over 95% of the metal content in lead-free solder. Cd can be found in semi-conductors and chip resistors in the WPCB category. Cr may be found as a protective layer for Cu in WPCB. Hence, these metals were selected and examined individually for their influences on the Cu recovery efficiency. 1 equivalent of $CdCl_2$, $SnCl_2$, and $CrCl_3$ with respect to the Cu content was added to the Cu SE reaction under the optimized reaction condition (FIG. 12).

The presence of $Cd^{2+}$ improved the Cu deposition compared to $Sn^{2+}$ and $Cr^{3+}$, but the Cu selectivity was only 55% owning to the co-deposition on Cd on the cathode surface. The result was consistent with other electrochemical deposition studies conducted in an aqueous environment: the presence of $Cd^{2+}$ competed for the Faradaic electrons with $Cu^{24}$ ion, resulting in co-deposition of the two metals. CV analyses of $Cd^{2+}$ (FIG. 13A) and $Cd^{2+}/Cu^{2+}$ (FIG. 13B) were conducted to analyze their deposition potentials. The reduction of $Cd^{2+}$ occurred at −0.71 V vs Ag/AgCl, occurred before the $Cu^{2+}+2e^-\rightarrow Cu^0$ reduction, and thus the co-deposition.

With $Sn^{2+}$, interestingly, the amount of Cu recovery decreased slightly compared with the $Cd^{2+}$ trial, but the Cu selectivity increased significantly. Almost no $Sn^2$ was deposited during the SE reaction. Considering $Sn^{2+}$ ($E^°=-0.14$ V vs NHE) has a more positive standard potential than $Cd^{24}$ ($E^°=-0.40$ V vs NHE), it was surprised to see there was barely any $Sn^{24}$ deposited. CV analysis revealed no observable Faradaic current in the expected region, suggesting the electrochemical deposition of $Sn^{2+}$ was unfavourable in the present experimental condition (FIG. 13C).

Lastly, in the presence of $Cr^{3+}$, the selectivity of $Cu^{2+}$ recovery reaches >99% as there was no Cr detected on the cathode. It may be attributed to the high reduction potential of $Cr^{3+}$ to $Cr^0$ ($E^°=-0.74$ V vs NHE), which makes it highly unfavorable to be fully reduced to $Cr^0$ on the cathode. Instead, $Cr^{3+}$ was likely to be reduced to $Cr^{2+}$ ($E^°=-0.41$ V vs NHE), which consumed some of the Faradaic electrons that could have been spent on $Cu^{2+}$ reduction, and thus lowered the amount of Cu recovery.

In summary, the three common dopant ions have variable influences on Cu recovery. Although Cd has a moderate impact on the Cu selectivity, it suggests that the current experimental setting may be useful in Cd recovery as well. Meanwhile, Cd did not interfere the Cu deposit amount. Sn and Cr did not reduce on the cathode surface, allowing Cu to be electrochemically recovered with great selectivity.

Example 4

Selective Recovery of Cu from WPCB Powder Via SE

The optimized reaction parameters (60 ppi, 10 mA) and solvent (EG) were applied to study the electrochemical leaching and recovery of Cu from WPCB powder. ICP-MS analysis showed that the WPCB powder contained 32.56 wt % of metallic content, of which 13.2 wt % was Cu (FIG. 3). The WPCB powder was circulated in the solution in the same manner as the Cu powder surrogate used during the optimization experiments. The reaction duration was calculated from the Cu content in the WPCB powder. For 1 g of WPCB, which contained 132 mg of Cu, the reaction was run for 500 min at 10 mA (0.2 mA $cm^{-2}$).

Based on the metallic composition of the cathode deposition, the $FE_C\%$ was 86.5%, which meant the majority of electrons was spent on the electrochemical deposition of metals instead of other side reactions, such as HER. The WPCB powder contained mainly Cu, Al, Zn, and Fe with a trace amount of other metals (FIG. 14, dark bar chart), and all of them were oxidizable (FIG. 14, white bar chart). Cu was recovered with good selectively on the cathode in the presence of 12 other abundant metals (FIG. 14, grey bar chart), with a selectivity of 53.8%. (FIG. 14, line chart). The high selectivity towards Cu as compared with other metals was mainly attributed to its highly reducible property. For example, the high reduction potential of Al. Zn, and Fe prevented their electrochemical reduction on the cathode. The standard reduction potential of the detected metal ions (vs. NHE) ranked as follow: $Cu^{2+}$ (+0.34 V)>$Pb^{2+}$ (−0.13 V)>$Fe^{2+}$ (−0.45 V)>$Cr^{3+}$ (−0.74 V)>$Zn^{2+}$ (−0.76 V)>$Mn^{2+}$ (−1.18 V) $Al^{3+}$ (−1.66 V)>$Mg^{2+}$ (−2.37 V)>$Ba^{2+}$ (−2.9 V). Despite their relatively high content, Al, Zn, and Fe are reduced at greater reduction potentials compared to Cu and thus were not deposited favorably. In principle, metals with a more positive reduction potential than Cu could have been deposited more favorably. However, in this case, their trace quantity in the WPCB sample made them almost non-detectable in cathode deposits.

Figure 14B:
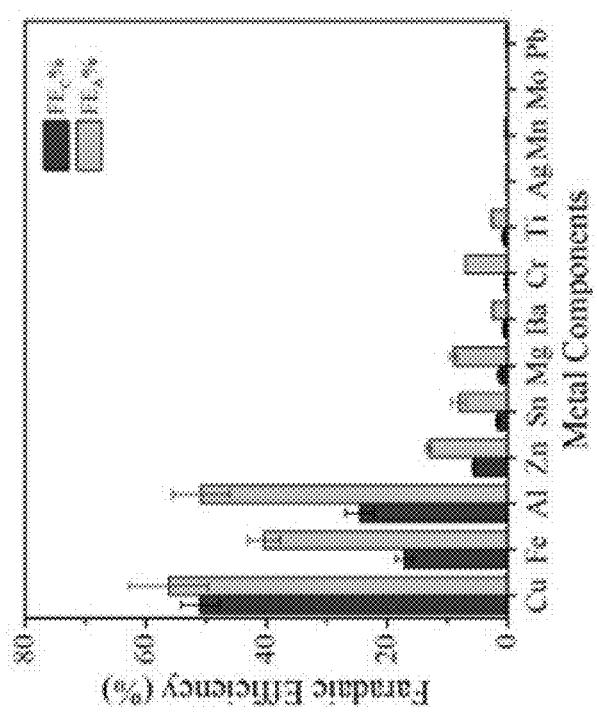
FIG. 14B is a graph that shows the cathodic and anodic Faradaic efficiency (FE$_A$ c %) of different metal content.
Figure 14A:
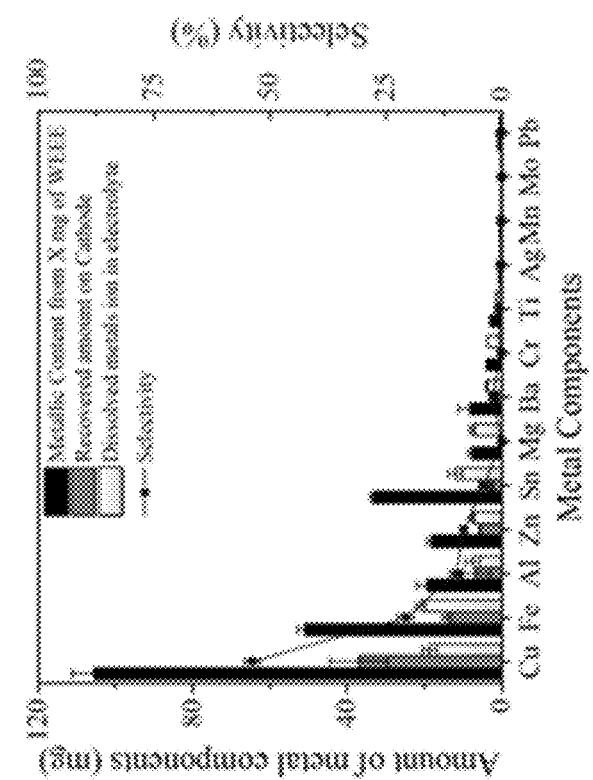
FIG. 14A is a graph that shows the distribution amount of different metals in the electrolyte and the cathode deposition during the optimized (10 mA, 60 ppi) SE of WPCB.

It is worth noting that the current SE system is particularly selective towards Cu over Ag and Pb, due to their exceptionally well binding affinity with halogen, $Cl^-$ in this case, from the supporting electrolyte. For example, the $K_{sp}$ of AgCl is $1.8\times10^{-10}$, indicating its highly insoluble nature, whereas the $K_{sp}$ of $PbCl_2$ is $1.59\times10^{-5}$, which is also considerably low and therefore insoluble nature is expected. Although $K_{sp}$ is typically applied to an aqueous environment. Kw would still be suitable to the analysis because EG is a pH-neutral solvent and does not hold any special property in solubilizing metal chloride. As shown in FIG. 14A, Ag and Pb were barely detected on the cathode even though they are not the lowest quantity metal in the WPCB (FIG. 3). Such results were comparable to Mo and Mn, which were the lowest quantity metals at 0.01 and 0.05 wt % in the WPCB, respectively.

The comparison demonstrated the binding affinity of the metal ions with the electrolyte's anion could influence the electrochemical recovery yield as well. Not all metallic components from the WPCB powders were oxidized electrochemically. Upon analyzing the Faradaic efficiency of the anodic dissolution process ($FE_A$ %), it was realized that the anodic $FE_A$ % of Al and Fe were exceedingly high compared to other metals (FIG. 14B, grey bar chart). This anomaly was due to their more negative standard reduction potentials compared to that of Cu, which made their $M^0$ state susceptible to oxidation by the surrounding $Cu^{2+}$ ion in the electrolyte, e.g. $2Al_{(s)}+3Cu^{2+}_{(aq)} \rightarrow 2Al^{3+}_{(aq)}+3Cu_{(s)}$. Therefore, a portion of the detectable $Al^{3+}$ and $Fe^{2+}$ ions was actually formed from chemical oxidation rather than electrochemical oxidation.

The present WPCB sample does not contain an appreciable amount of precious metal (PM), e.g., Au or Pd. However, recovering PM can be highly economically attractive to any WPCB recycling operation. Because of their low quantity in WPCB, PM-containing components are often isolated and recycled separately to maximize the recapturing of PM.

The applicability of the SE reaction to recapture Pd, which can be found in relatively high quantity inside of the varistors and capacitors was examined, using 150 μmol of $Pd(NO_3)_2 \cdot 2H_2O$, as $Pd^{2+}$ source. The $Pd(NO_3)_2 \cdot 2H_2O$ was dissolved in 20 mL of EG with supporting electrolyte, and the reaction was run at 0.6 mA cm$^{-2}$ for 30 min at room temperature. It was determined that 74.5 μmol of Pd metal was successfully recovered on the cathode surface according to ICP-MS. The metal deposition quantity was similar to the Cu recovery presented in FIG. 12, indicating the SE system could also recapture the PM.

Example 5

Reusable of Ethylene Glycol (EG)

The reusability of EG electrolyte was examined by reusing the electrolyte consecutively for 6 times. The study was first conducted with the 20 mg of Cu metal powder in each recycling trial, which served as a control experiment to examine how Cu alone affects EG recycling. Then, in a separate experiment. 1 g of WPCB powder was applied to investigate how WPCB powder affected the reusability of EG. The concentration of metal ions in the electrolyte, electrolyte conductivity, and metal deposition were examined at the end of each trial. After each trial, the electrolyte was filtered to remove any solid remnants, such as residual Cu metal or WPCB powder before the subsequent trial. The RVC electrode was rinsed and thoroughly dried before it was reused. On average, less than 1 mL of EG was added for the subsequent trial because some of the EG electrolyte was retained in the RVC pores and the porous separation cloth. The replenishment of EG between trials did not induce any abnormal change to the $Cu^{2+}$ ion concentration in the electrolyte for the subsequent trial; the $Cu^{2+}$ ion concentration at the end of each reaction matched well with the beginning of the subsequent trial.

Figure 15:
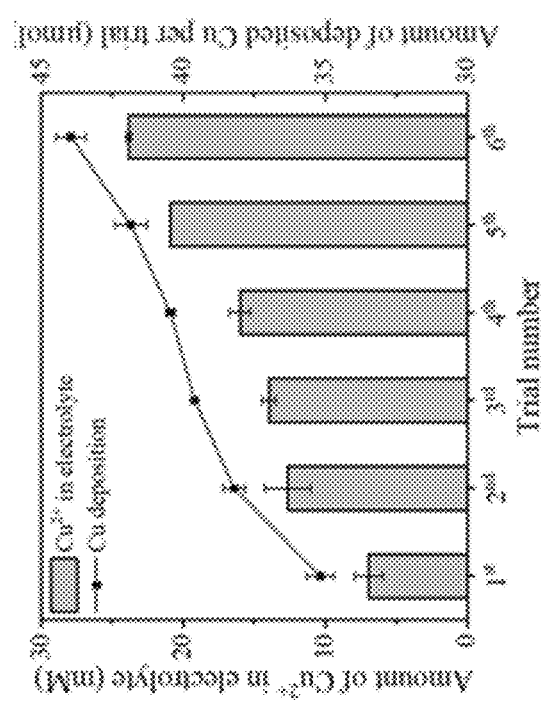
FIG. 15 is a graph that shows the change in Cu$^{2+}$ ion in electrolyte and Cu deposition from each electrolyte-recycling trial using the Cu metal powder per trial.

When Cu metal powder was used for the EG recycling experiment, the amount of $Cu^{2+}$ ion in the electrolyte grew each time the EG is recycled (FIG. 15). The steady growth of $Cu^{2+}$ ion indicated the rate of Cu oxidation on the RVC anode was faster than that of its reduction on the cathode. The increase in $Cu^{2+}$ ion also brought up the conductivity of the electrolyte. The Cu deposition improved each time the EG electrolyte is recycled. The deposition improvement may be attributed to the increase of Cu ion in the electrolyte, which subsequently increased the amount of $Cu^{24}$ ion available for reduction on the cathode surface. The observation is consistent with the supporting electrolyte study discussed above (FIG. 9). The result indicated that the repeated use of the EG electrolyte could offer a positive influence on the electrochemical recovery of Cu.

When WPCB powder was used for the electrolyte-recycling experiment, a similar growth trend with the $Cu^{2+}$ ion was also observed. After the $3^{rd}$ trial, 25 mg of $NH_4Cl$ to the electrolyte solution was added to maintain the conductivity of the electrolyte. Compared to the Cu metal study, there was significantly more Cu deposited on the cathode. The Cu electrochemical oxidation and deposition was unexpectedly more efficient. The highly efficient of Cu recovery suggested the reaction might be scalable. Similar to the Cu powder experiment, a small increase in conductivity was also observed with the increase in metal ions in the electrolyte, but the overall potential differences were maintained steadily at around 2.44±0.34 V (FIG. 16). The Cu selectivity, which was calculated from the deposit of 12 other metals of the $1^{st}$, $2^{nd}$, $3^{rd}$, $4^{th}$ $5^{th}$ and $6^{th}$ use were 51.5%, 51.3%, 59.7%, 56.5%, 54.2% and 55.1%, respectively (FIG. 17).

Figure 18:
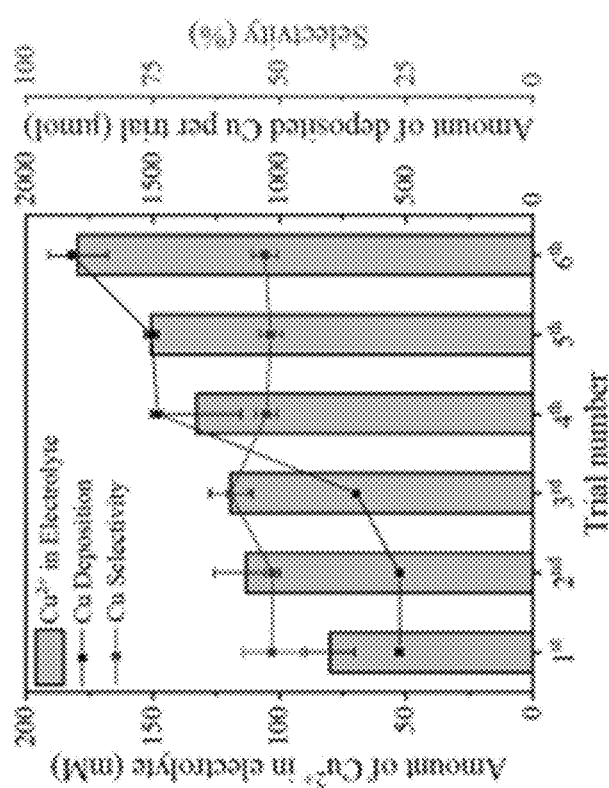
FIG. 18 is a graph that shows the change in Cu$^{2+}$ ion in the electrolyte and Cu deposition per trial from each electrolyte-recycling trial using WPCB powder trial.

The averaged Cu selectivity of the 6 solvent reuse trials was 54.7±3.2%; the deviation was considerably stable. The growth of Cu metal deposition amount with the steady Cu selectivity implied the total metal deposition grew from each trial. Upon analyzing the $FE_c$, which quantified the portion of electrons spent on metal deposition, it was found that the SE reaction became increasingly selective towards metal deposition over other cathodic reactions each time the SE solvent is recycled. The $FE_c$ of 1° to the $6^{th}$ trial were 82.2%, 82.4%, 99.1%, 97.7%, 98.8%, 97.8%, respectively. Similar to the solvent recycling experiments when using Cu metal, the accumulation of metal ions in the electrolyte improved their deposition, and thus the rising of $FE_c$ (FIG. 18).

Example 6

Reaction Scaled-Up and Energy Expenditure Assessment

To demonstrate the feasibility of scaling up, the reaction volume was increased by 20-fold to 400 mL and SE was conducted in the optimal current density setting of 0.2 mA cm$^{-2}$, which corresponded to the 10 mA current flow applied during the optimization study. A scaled-up RVC anode with a dimension of 60×5×50 mm, and a Cu cathode plate with a dimension of 60×0.1×50 mm were used. Instead of using a plastic tube casing, the Cu cathode plate was kept inside a porous cotton cloth bag, which acted as a Cu powder filter to prevent metallic powder adhesion on the cathode. The resulting Cu deposition was determined gravimetrically. After 5 h of SE at room temperature, 1.4 g of the Cu metal was successfully recovered from 2 g of Cu metal powder circulating in the EG electrolyte, corresponding to 70% of the Cu recovery.

Figure 19B:
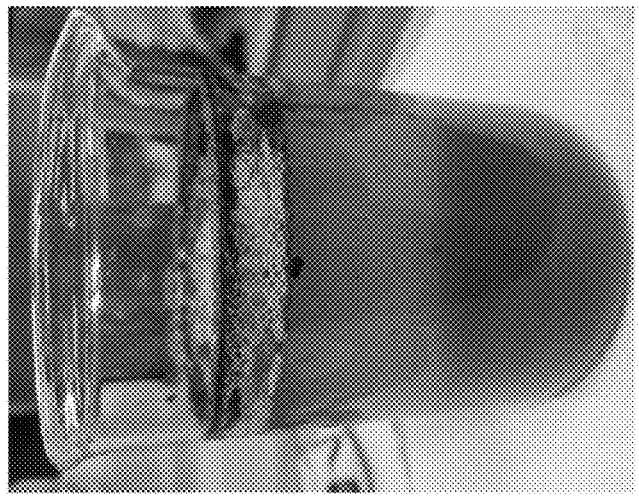
FIG. 19B shows the electrolyte color after reaction in scaling up trial using 10 g WPCB powder.
Figure 19A:
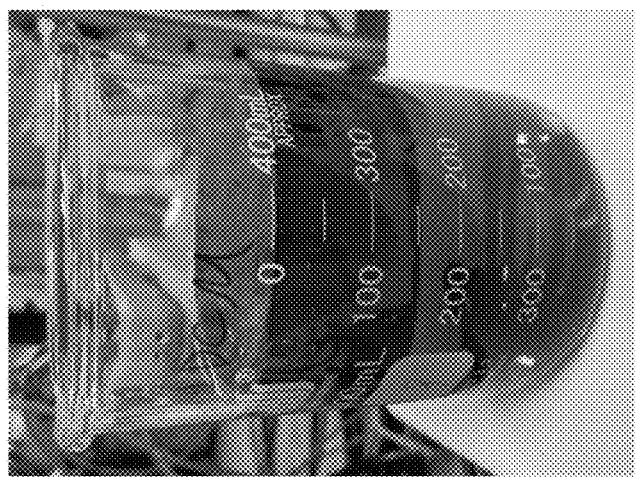
FIG. 19A shows the electrolyte color after reaction in scaling up trial using 2 g Cu powder.
Figure 20B:
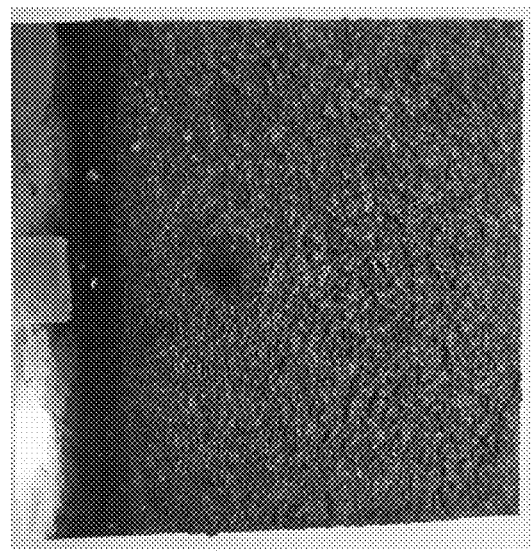
FIG. 20B shows the appearance of post-reaction Cu plate surface using WPCB as the substrate.
Figure 20A:
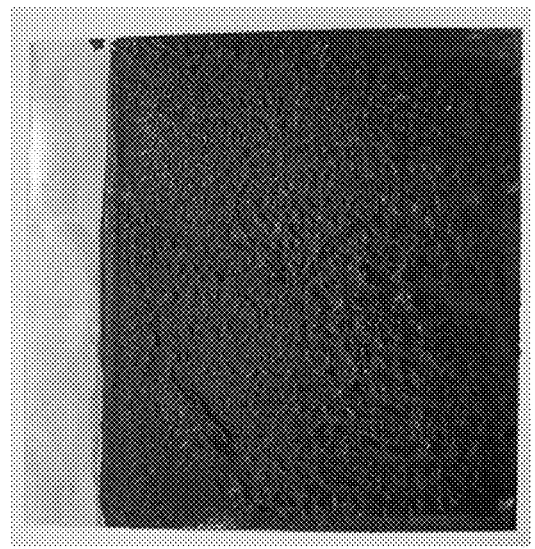
FIG. 20A shows the appearance of post-reaction Cu plate surface using Cu powder as the substrate.

After the Cu trial, 10 g of WPCB powder, which contained approximately 3.26 g of metal (1.32 g was Cu), was attempted (FIG. 3). The WPCB powder was electrolyzed in a similar scaled up SE reaction under the same conditions. After 5 h of SE at 200 mA (0.2 mA cm$^2$), 1.2 g of metal was deposited on the cathode, corresponding to 36.8% of the metal content recovered. Based on the Cu selectivity obtained from the optimization study (59.7%), which meant 0.72 g of Cu was recovered in the scaled-up SE reaction. The electrolyte color changed from colorless to turquoise, indicating the presence of a large amount of Cu$^{2+}$ ion. When comparing the post-reaction electrolyte color between the Cu-metal trial and the WPCB trial, the WPCB trials showed mild cloudiness that was most likely resulted from the residual plastic remnant of the WPCB (FIGS. 19A and 19B). As for the cathode deposit, both electrodes obtained from the Cu metal and WPCB powder displayed similar texture, confirming the applicability of the SE system to recover the metal components from the WPCB powder (FIGS. 20A and 20B).

Based on the Cu content recovered from the WPCB powder in the scaled-up experiment, it was calculated that it would take 5.3 kW·hr to recover 1 kg Cu from WPCB. The energy consumption included 2.08 kW·hr spent on the SE reaction (i.e. the energy spent on both the leaching and electrodeposition is 2.08 kW·hr), and 3.22 kW·hr required to blend the WPCB scraps to powder (FIG. 21). In contrast, it is estimated that the pyrometallurgical or hydrometallurgical leaching method alone (without taking electrodeposition and energy required for blending into account) would already require 7763 and 7568 MJ ton$^{-1}$ of metal, equivalent to 2.16 and 2.10 kW·hr kg$^{-1}$, respectively (1 MJ ton$^{-1}$=3.6 kW·hr). Thus, it is expected that even more energy will be consumed for the pyrometallurgical or hydrometallurgical leaching method when the subsequent electrodeposition process is considered as well. That said, for recovering a given metal from WPCB, the SE reaction of the present invention is more energy-efficient and environmentally friendly since it would require much less energy as compared with the pyrometallurgical or hydrometallurgical method. Moreover, it did not require incineration temperature or highly acidic electrolytes to facilitate metal leaching.

The invention has been given by way of example only, and various other modifications of and/or alterations to the described embodiment may be made by persons skilled in the art without departing from the scope of the invention as specified in the appended claims.

The invention claimed is:

1. A metal recovery device for recovering metal in a waste printed circuit board by way of electrodeposition comprising:
   a cathode,
   an anode, and
   an electrolyte in electrical communication with the cathode and the anode,
   wherein the anode, consists of porous reticulated vitreous carbon which exhibits a honeycomb arrangement, is adapted to facilitate the capture of the metal in the waste printed circuit board to undergo oxidative leaching, and the electrolyte comprises a chelating agent of glycol-based compound and potassium chloride to prevent precipitation of the metal ions and maintain the metal ions available for cathodic reductive deposition.

2. The metal recovery device according to claim 1, wherein the glycol-based compound is a petrochemical.

3. The metal recovery device according to claim 1, wherein the glycol-based compound is a monomeric glycol.

4. The metal recovery device according to claim 3, wherein the monomeric glycol is ethylene glycol.

5. The metal recovery device according to claim 3, wherein the monomeric glycol is propylene glycol.

6. The metal recovery device according to claim 1, wherein the porous reticulated vitreous carbon has a porosity from about 10 ppi to about 100 ppi.

7. The metal recovery device according to claim 1, wherein the porous reticulated vitreous carbon is submerged in the electrolyte at a predetermined submerged depth which is determined with reference to the porosity of the anode.

8. The metal recovery device according to claim 1, wherein the cathode comprises a cathode material selected from a group consisting of nickel, copper, iron, nickel foam, copper foam, aluminum foam, carbon cloth, carbon foam, and a combination thereof.

9. The metal recovery device according to claim 8, wherein the cathode material is covered by a substantially porous structure.

10. The metal recovery device according to claim 9, wherein the substantially porous structure has a porosity from about 100 mesh to about 200 mesh.

11. The metal recovery device according to claim 9, wherein the substantially porous structure comprises a material selected from a group consisting of cotton cloth, porous carbon cloth, plastic cloth and a combination thereof.

12. The metal recovery device according to claim 1, wherein the electrodeposition is conducted at a current density from about 0.2 mA cm$^{-2}$ to about 300 mA cm$^{-2}$.

13. The metal recovery device according to claim 1, wherein the metal recovered is a heavy metal.

14. The metal recovery device according to claim 13, wherein the heavy metal is copper.

15. The metal recovery device according to claim 1, wherein the electrolyte further comprises NH$_4$Cl.

16. The metal recovery device according to claim 1, wherein the electrolyte is reusable for two or more electrodeposition cycles.

17. The metal recovery device according to claim 16, wherein sensitivity of the device is between about 50% to about 60% in each electrodeposition cycle.

18. The metal recovery device according to claim 16, wherein the sensitivity of the device increases with a number of cycles the electrolyte is reused.

19. The metal recovery device according to claim 18, wherein the device has a sensitivity of about 60% when the electrolyte is reused for three electrodeposition cycles.

20. The metal recovery device according to claim 18, wherein the number of cycles the electrolyte is reused is proportional to cathodic Faradaic efficiency of the device.

21. The metal recovery device according to claim 20, wherein the cathodic Faradaic efficiency of the device is at about 99%, when the electrolyte is reused for three electrodeposition cycles.

22. The metal recovery device according to claim 16, wherein metal selectivity of the device is at least 50% in each electrodeposition cycle.

23. The metal recovery device according to claim 16, wherein metal recovery of the device is between about 26% to about 70% in each electrodeposition cycle.

* * * * *